US012063707B2

(12) United States Patent
Guo et al.

(10) Patent No.: US 12,063,707 B2
(45) Date of Patent: Aug. 13, 2024

(54) ACTIVE CROSS-TECHNOLOGY NEIGHBOR DISCOVERY

(71) Applicants: Mitsubishi Electric Research Laboratories, Inc., Cambridge, MA (US); Mitsubishi Electric Corporation, Tokyo (JP)

(72) Inventors: Jianlin Guo, Newton, MA (US); Shuai Wang, Fairfax, VA (US); Pu Wang, Cambridge, MA (US); Kieran Parsons, Cambridge, MA (US); Philip Orlik, Cambridge, MA (US); Yukimasa Nagai, Tokyo (JP); Takenori Sumi, Tokyo (JP)

(73) Assignees: Mitsubishi Electric Research Laboratories, Inc.; Mitsubishi Electric Corporation, Tokyo (JP)

( * ) Notice: Subject to any disclaimer, the term of this patent is extended or adjusted under 35 U.S.C. 154(b) by 331 days.

(21) Appl. No.: 17/657,460

(22) Filed: Mar. 31, 2022

(65) Prior Publication Data

US 2023/0319539 A1 Oct. 5, 2023

(51) Int. Cl.
*H04W 8/00* (2009.01)
*H04L 27/26* (2006.01)
*H04W 4/80* (2018.01)

(52) U.S. Cl.
CPC ......... *H04W 8/005* (2013.01); *H04L 27/2636* (2013.01); *H04W 4/80* (2018.02)

(58) Field of Classification Search
CPC ............................... H04W 8/005; H04W 4/80
See application file for complete search history.

(56) References Cited

U.S. PATENT DOCUMENTS

2016/0100350 A1\* 4/2016 Laraqui .................. H04L 67/63
                                                                370/328
2018/0352055 A1\* 12/2018 He ......................... H04W 16/14

OTHER PUBLICATIONS

Rainer Hofmann et al."Cross-Technology Neighbour Discovery and Rendezvous for Low-Power Wireless Devices", Proceedings of the 2021 International Conference on Embedded Wireless Systems and Networks, Feb. 2021 pp. 151-162.

(Continued)

*Primary Examiner* — Samina F Choudhry
(74) *Attorney, Agent, or Firm* — Gene Vinokur; Hironori Tsukamoto

(57) ABSTRACT

A computer-implemented method is provided for discovering heterogenous neighbors in coexisting IoT networks including at least one Wi-Fi device and at least one of Zigbee coordinators, ZigBee routers and ZigBee end devices. The method includes generating a broadcast packet such that the broadcast packet emulates a ZigBee broadcast frame, transmitting the emulated broadcast packet using a transceiver of the at least one Wi-Fi device according to cross-technology communication (CTC) method, wherein the emulated broadcast packet is configured to trigger the at least one of the Zigbee coordinators and ZigBee routers having received the emulated broadcast packet to rebroadcast the received packet. The method also includes generating a unicast packet such that the unicast packet emulates a ZigBee address request frame, transmitting the emulated unicast packet using a transceiver of the at least one Wi-Fi device according to cross-technology communication (CTC) method, wherein the emulated unicast packet is configured to trigger the at least one of the Zigbee coordinators, ZigBee routers and ZigBee end devices having received the emulated unicast packet to respond with a ZigBee address response frame, and determining the at least one ZigBee end (Continued)

device to be a neighbor of the at least one Wi-Fi device if the scanned address response frame is transmitted by the at least one ZigBee end device.

27 Claims, 19 Drawing Sheets

(56) References Cited

OTHER PUBLICATIONS

Junmei Yao et al., "Cross-Technology Communication for Heterogeneous Wireless Devices through Symbol-Level Energy Modulation", IEEE Transactions on Mobile Computing, Mar. 17, 2021.
Demin Gao et al., "Neighbor Discovery Based on Cross-Technology Communication for Mobile Applications", IEEE Transactions On Vehicular Technology, vol. 69, No. 10, Oct. 2020.

* cited by examiner

Wi-Fi packet transmission and ZigBee packet transmission interfere with each other

Fig. 7A

| Octets: 2 | 1 | 0/2 | 0/2/8 | 0/2 | 0/2/8 | variable | 2 |
|---|---|---|---|---|---|---|---|
| Frame control | Sequence number | Destination PAN identifier | Destination address | Source PAN identifier | Source address | Frame payload | FCS |
| | | Addressing fields | | | | | |
| MHR | | | | | | MAC payload | MFR |

Fig. 7B

| Bits: 0–2 | 3 | 4 | 5 | 6 | 7–9 | 10–11 | 12–13 | 14–15 |
|---|---|---|---|---|---|---|---|---|
| Frame type | Security enabled | Frame pending | Ack. request | Intra-PAN | Reserved | Dest. addressing mode | Reserved | Source addressing mode |

Fig. 7C

| Frame type | Security enabled | Frame pending | Ack. request | Intra-PAN | Reserved | Dest. Addressing mode | Reserved | Source addressing mode |
|---|---|---|---|---|---|---|---|---|
| 001 | 0 | 0 | 0 | 1 | 000 | 10 | 00 | 00 |

Fig. 8A

| Octets: 2 | 2 | 1 | 1 | 0/8 | 0/8 | 0/1 | Variable | Variable |
|---|---|---|---|---|---|---|---|---|
| Frame control | Destination address | Source address | Radius | Sequence number | Destination IEEE Address | Source IEEE Address | Multicast control | Source route subframe | Frame payload |

NWK Header — 810
Payload — 820
830

Fig. 8B

| Bits: 0-1 | 2-5 | 6-7 | 8 | 9 | 10 | 11 | 12 | 13 | 14-15 |
|---|---|---|---|---|---|---|---|---|---|
| Frame type | Protocol version | Discover route | Multicast flag | Security | Source Route | Destination IEEE Address | Source IEEE Address | End Device Initiator | Reserved |

| Frame type | Protocol version | Discover route | Multicast flag | Security | Source Route | Destination IEEE Address | Source IEEE Address | End Device Initiator | Reserved |
|---|---|---|---|---|---|---|---|---|---|
| 00 | 001 | 00 | 0 | 0 | 0 | 0 | 0 | 0 | 00 |

850

| Octets: 1 | 0/1 | 0/2 | 0/2 | 0/2 | 0/1 | 1 | 0/Variable | Variable |
|---|---|---|---|---|---|---|---|---|
| Frame control | Destination endpoint | Group address | Cluster identifier | Profile identifier | Source endpoint | APS counter | Extended header | Frame payload |
| | Addressing fields | | | | | | | |
| APS header | | | | | | | APS payload | |

Fig. 9A

| Bits: 0-1 | 2-3 | 4 | 5 | 6 | 7 |
|---|---|---|---|---|---|
| Frame type | Delivery mode | Ack. format | Security | Ack. request | Extended header present |

Fig. 9B

| Octets: 1 | 0/1 | 0/2 | 2 | 2 | 1 | 1 | 0/Variable | Variable |
|---|---|---|---|---|---|---|---|---|
| Frame control | Destination endpoint | Group address | Cluster identifier | Profile identifier | Source endpoint | APS counter | Extended header | Frame payload |
| | Addressing fields | | | | | | | APS pay-load |
| APS header | | | | | | | | |

Fig. 9C

| Frame type | Delivery mode | Ack. format | Security | Ack. request | Extend header present |
|---|---|---|---|---|---|
| 00 | 00 | 0 | 0 | 1 | 0 |

Fig. 9D

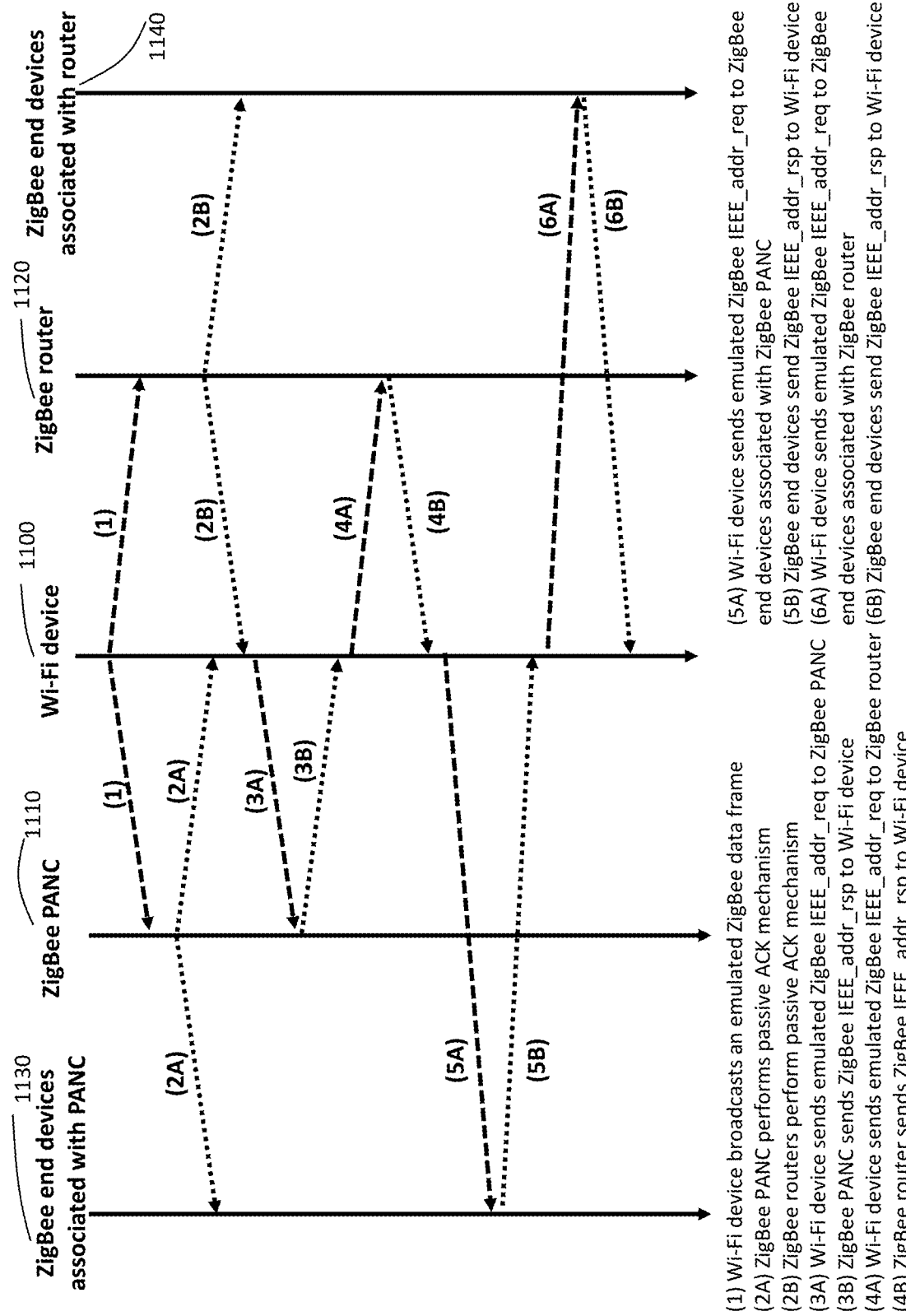

| Data Symbol (dec.) | Data Symbol (bin.) | Chip Values (c0 c1...c15) |
|---|---|---|
| 1 | 0000 | 0011111000100101 |
| 2 | 1000 | 0100111100001001 |
| 3 | 0100 | 0101001111100010 |
| 4 | 1100 | 1001010011111000 |
| 5 | 0010 | 0010010101001110 |
| 6 | 1010 | 1000100101001111 |
| 7 | 1110 | 1111000101000100 |
| 8 | 0001 | 0110101101110011 |
| 9 | 1001 | 0001101011011100 |
| 10 | 0101 | 0000110101011011 |
| 11 | 1101 | 1100001101011101 |
| 12 | 0011 | 0110000101010011 |
| 13 | 1011 | 1101100001010 |
| 14 | 0111 | 1011011100000110 |
| 15 | 1111 | 1010110111000001 |

Fig. 14

ACTIVE CROSS-TECHNOLOGY NEIGHBOR DISCOVERY

FIELD OF THE INVENTION

This invention relates generally to neighbor discovery in wireless communication networks, and particularly to discover heterogenous neighbors in the coexisting IoT networks.

BACKGROUND OF THE INVENTION

Internet of Things (IoT) applications have been rapidly growing. A broad range of wireless communication technologies have been developed to cater the diverse applications. For example, IEEE 802.11 and IEEE 802.15.4 are two commonly referred standard families. Both 802.11 and 802.15.4 standards are designed to operate in 2.4 GHz and Sub-1 GHz bands while 802.11 standards can also operate in 5 GHz, 6 GHz and millimeter wave bands. When the co-located heterogeneous wireless networks, e.g., 802.11 network and 802.15.4 network, operate in overlapped or shared frequency band, one network becomes an interfering network to another network. However, the problem is that one network does not know the existence of another network because they cannot communicate. As heterogeneous wireless technologies are emerging, interference among wireless networks using different communication technologies becomes critical issue to be addressed.

In general, the interference can be divided into:
In-technology interference
Cross-technology interference In-technology interference occurs when the co-located devices with same wireless communication technology transmit simultaneously in overlapped or shared frequency band, e.g., two Wi-Fi devices. These devices can be in same network or belong to different networks.

Cross-technology interference occurs when the co-located devices with different wireless communication technologies transmit simultaneously in overlapped or shared frequency band, e.g., Wi-Fi device and ZigBee. In general, the devices with different communication technologies belong to different networks.

Accordingly, the neighbors of a network device can be divided into two classes:
In-technology (homogenous) neighbors
Cross-technology (heterogeneous) neighbors An in-technology neighbor is a neighboring device that uses same communication technology as the device does, i.e., two devices can communicate. For example, a Wi-Fi device can communicate with another Wi-Fi device.

A cross-technology neighbor is a neighboring device that uses different communication technology as the device does, i.e., two devices cannot communicate. For example, a Wi-Fi device cannot communicate with a ZigBee device.

There are two categories of interference mitigation approaches:
Coordinated approach
Distributed approach The coordinated approach is feasible solution to mitigate the in-technology interference because devices can communicate and some devices such as Wi-Fi AP can act as coordinators to mitigate the interference. It can also be applied to mitigate cross-technology interference, e.g., using multi-mode devices such as smart hub that can communicate using multiple communication technologies to coordinate the heterogenous wireless devices for interference reduction. However, this approach fits hotspot and office building and is impractical for large scale outdoor IoT applications, e.g., smart utility and smart city, due to the requirement of the multi-mode devices.

In the distributed approach, network devices spontaneously manage interference control without coordinator. This approach is also feasible to mitigate in-technology interference. It can also be applied to mitigate cross-technology interference, especially fits large scale outdoor IoT applications because of low cost and easy deployment. However, a key challenge is that how a network device knows the existence of cross-technology neighbors, i.e., how to discover cross-technology neighbor. Therefore, cross-technology neighbor discovery becomes an essential step to mitigate cross-technology interference.

In principle, neighbor discovery is to discover neighbors that exist but are not known yet by the discovering device. In other words, the discovering device knows nothing about the neighbors to be discovered. However, some existing neighbor discovery mechanisms are based on the prior knowledge of the neighbors. For example, the neighbor discovery in IP protocol and the device discovery in ZigBee protocol use neighbor's one type of address known in advance to acquire another type of address of that neighbor. Take IP neighbor discovery for example, the discovering device A knows neighbor B's IP address in advance and wants to know neighbor B's link address. In this case, device A sends a neighbor solicitation message to device B, upon receiving the solicitation message from device A, device B responds with a neighbor advertisement message to device A containing device B's link address. Upon receiving the neighbor advertisement message, device A obtains device B's link address. There are three assumptions in these mechanisms: (i) device A knows the existence of device B, (ii) device A knows one type of addresses of device B and (iii) device A and device B can communicate.

It is easier to discovery in-technology neighbors because the discovering device can communicate with neighbors. In-technology neighbor discovery has been widely studied in wireless networks such as Wi-Fi network and ZigBee network. The in-technology neighbor discovery designs work well because neighbor discovery is performed among devices that can communicate.

However, discovering cross-technology neighbor is very challenging because cross-technology devices cannot communicate due to the incompatible PHY layers. There are existing cross-technology neighbor discovery methods that use cross-technology communication (CTC) technologies. However, these methods either assume neighbors are capable of CTC or can only perform one-way cross-technology message transmission or require modifications on device's communication functions, which is impractical for devices that are already deployed. Most importantly, the existing methods do not provide any protocol for cross-technology neighbor discovery.

Accordingly, it is desirable to provide cross-technology neighbor discovery methods to actively and accurately discover cross-technology neighbors via two-way communication without requiring hardware/firmware modification.

SUMMARY OF THE INVENTION

Some embodiments of the invention are based on recognition that cross-technology neighbor discover is very important for the emerging IoT networks, where multiple networks using different wireless communication technologies coexist, compete for the limited spectrum and therefore, interfere with each other. Therefore, it is critical for a network device to discover cross-technology neighboring devices and coordinate with these devices to reduce mutual interference and improve network performance. However, the existing neighbor discovery mechanisms are designed to discover homogeneous neighbors, where the discovering device can communicate with neighbors to be discovered due to the use of same communication technology.

It is an object of various embodiments of the invention to provide cross-technology neighbor discovery method to discover cross-technology neighbors. To that end, some embodiments of invention provide a cross-technology neighbor discovery method named as X-Disco that enables a Wi-Fi device to discovery ZigBee neighbors via two-way cross-technology communications.

Some embodiments are based on a realization that it is impractical or even impossible to modify communication functions of the commercial devices, especially the devices already deployed in use. As a result, the neighbor discovery technologies that require modification on communication protocol are not feasible in real application.

It is an object of various embodiments of the invention to provide software only solution to discover cross-technology neighbors. To that end, the X-Disco is a software only solution that enables a commodity Wi-Fi device to discovery commodity ZigBee neighbors without any modification on ZigBee device and only software update on Wi-Fi device.

Some embodiments of the invention are based on recognition that the network devices only decode the received signals that are modulated with compatible modulation scheme and discard all non-understandable signals. For example, a Wi-Fi device will not decode ZigBee signals because Wi-Fi and ZigBee have different modulation schemes and different packet formats. Similarly, a ZigBee device will not decode Wi-Fi signals. Therefore, in order to decode cross-technology signals, the transmitter needs to modulate signal accordingly to the protocol of the receiver or the receiver needs new method to decode the cross-technology signals.

It is an object of various embodiments of the invention to provide methods to decode cross-technology signals by cross-technology devices. To that end, X-Disco enables Wi-Fi device to transmit the emulated ZigBee packet to ZigBee neighbors so that ZigBee neighbors can decode the emulated packet. X-Disco also provides ZigBee Symbol Extract method to enable Wi-Fi device to decode ZigBee packet. As a result, X-Disco realizes two-way communication between Wi-Fi device and ZigBee device for cross-technology neighbor discovery.

Accordingly, some embodiments of the invention enable Wi-Fi device to send the emulated packets constructed according to ZigBee protocol so that ZigBee devices can decode the packets transmitted by Wi-Fi devices. Some embodiments of the invention also provide symbol-level ZigBee signal extract method so that Wi-Fi devices can decode ZigBee packets transmitted by ZigBee devices. ZigBee symbol is decoded by comparing similarity between the provided template symbols and the received symbols.

Some embodiments of the invention are based on recognition that there are protocols for in-technology neighbor discovery. However, there is no protocol for cross-technology neighbor discovery. Therefore, there is a need to provide protocol for cross-technology neighbor discovery.

Accordingly, some embodiments of the invention provide cross-technology neighbor discovery protocol compatible with communication protocols used by cross-technology devices, wherein the protocol provides step-by-step instructions to Wi-Fi device to actively initiate the ZigBee neighbor discovery process by transmitting an emulated ZigBee broadcast packet, discover ambient ZigBee coordinator and routers via decoding information contained in the re-broadcasted packets, acquire ZigBee end device information from ZigBee coordinator and routers via exchanging the ZigBee neighbor discovery request and ZigBee neighbor discovery response frames and determine if ZigBee end devices are the neighbors of Wi-Fi device via exchanging the ZigBee IEEE address request and the ZigBee IEEE address response frames.

According to some embodiments of the present invention, a computer-implemented method is provided for discovering heterogenous neighbors in coexisting IoT networks including at least one Wi-Fi device and at least one of Zigbee coordinators, ZigBee routers and ZigBee end devices. In this case, the method uses a processor coupled with a memory storing instructions implementing the method, wherein the instructions, when executed by the processor, carry out at steps of the method, including generating a broadcast packet such that the broadcast packet emulates a ZigBee broadcast frame; transmitting the emulated broadcast packet using a transceiver of the at least one Wi-Fi device according to cross-technology communication (CTC) method, wherein the emulated broadcast packet is configured to trigger the at least one of the Zigbee coordinators, ZigBee routers and ZigBee end devices having received the emulated broadcast packet to rebroadcast the received packet; switching a status of the at least one Wi-Fi device to a spectral scan mode to scan rebroadcasted packets from the at least one of ZigBee coordinators, ZigBee routers and ZigBee end devices; decoding the scanned rebroadcast packets to obtain ZigBee PAN ID and a network address of the at least one of the ZigBee coordinators, ZigBee routers and ZigBee end devices having a rebroadcasted packet; generating an unicast packet such that the unicast packet emulates a ZigBee address request frame with a destination address set to a network address of the at least one of Zigbee coordinators, ZigBee routers and ZigBee end devices; transmitting the emulated unicast packet using the transceiver of the at least one Wi-Fi device according to the CTC method, wherein the emulated unicast packet is configured to trigger the at least one of the Zigbee coordinator, ZigBee routers and ZigBee end devices having received the emulated unicast packet to transmit a ZigBee address response frame; switching the status of the at least one Wi-Fi device to a spectral scan mode to scan the ZigBee address response frame from the at least one of ZigBee coordinators, ZigBee routers and ZigBee end devices; decoding the scanned ZigBee address response frame to obtain network addresses of the ZigBee end devices associated with the ZigBee coordinator or ZigBee router having transmitted the ZigBee address response frame; switching the status of the at least one Wi-Fi device to a spectral scan mode to scan an address response frame from at least one ZigBee end device; and determining the at least one ZigBee end device to be a neighbor of the at least one Wi-Fi device if the scanned address response frame is transmitted by the at least one ZigBee end device.

Further, some embodiments of the present invention provide a communication device (Wi-Fi device) for discovering heterogenous neighbors in coexisting IoT networks including at least one Wi-Fi device and at least one of Zigbee coordinators, ZigBee routers and ZigBee end devices. The communication device may include a transceiver configured to transmit and receive a broadcast packet to communicate with the at least one of Zigbee coordinators, ZigBee routers and ZigBee end devices via wireless channels; a memory configured to store a computer-implemented method for discovering heterogenous neighbors in coexisting IoT networks including at least one Wi-Fi device and at least one of Zigbee coordinators, ZigBee routers and ZigBee end devices; and a processor configured to execute the computer-implemented method, wherein the method causes the processor coupled with the memory storing instructions implementing the method. The processor carries out at steps of the instructions, including generating the broadcast packet such that the broadcast packet emulates a ZigBee broadcast frame; transmitting the emulated broadcast packet using a transceiver of the at least one Wi-Fi device according to cross-technology communication (CTC) method, wherein the emulated broadcast packet is configured to trigger the at least one of the Zigbee coordinators, ZigBee routers and ZigBee end devices having received the emulated broadcast packet to rebroadcast the received packet; switching a status of the at least one Wi-Fi device to a spectral scan mode to scan rebroadcasted packets from the at least one of ZigBee coordinators, ZigBee routers and ZigBee end devices; decoding the scanned rebroadcast packets to obtain ZigBee PAN ID and a network address of the at least one of the ZigBee coordinators, ZigBee routers and ZigBee end devices having a rebroadcasted packet; generating an unicast packet such that the unicast packet emulates a ZigBee address request frame with a destination address set to a network address of the at least one of Zigbee coordinators, ZigBee routers and ZigBee end devices; transmitting the emulated unicast packet using the transceiver of the at least one Wi-Fi device according to the CTC method, wherein the emulated unicast packet is configured to trigger the at least one of the Zigbee coordinator, ZigBee routers and ZigBee end devices having received the emulated unicast packet to transmit a ZigBee address response frame; switching the status of the at least one Wi-Fi device to a spectral scan mode to scan the ZigBee address response frame from the at least one of ZigBee coordinators, ZigBee routers and ZigBee end devices; decoding the scanned ZigBee address response frame to obtain network addresses of the ZigBee end devices associated with the ZigBee coordinator or ZigBee router having transmitted the ZigBee address response frame; switching the status of the at least one Wi-Fi device to a spectral scan mode to scan an address response frame from at least one ZigBee end device; and determining the at least one ZigBee end device to be a neighbor of the at least one Wi-Fi device if the scanned address response frame is transmitted by the at least one ZigBee end device.

Some embodiments of the invention are based on recognition that the passive cross-technology neighbor discovery method is not accurate and not efficient in discovering cross-technology neighbors due to the facts that most of low power devices such as ZigBee devices are battery powered. To extend battery lifetime, such devices sleep most of the time. Even if a low power device awakes, it may not make any transmission, e.g., a smart meter may transmit every 15 minutes or longer. Therefore, it is possible to miss such devices. Furthermore, during the passive listening, the discovering device may not be able to transmit, which can cause non-acceptable long delay for Wi-Fi transmissions.

Accordingly, X-Disco is an active cross-technology neighbor discovery method that enables Wi-Fi device to actively trigger ZigBee neighbors to respond, which speeds up the discovery process and increases the discovery accuracy.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 7A depicts general IEEE 802.15.4-2003 MAC frame format, which is adopted by ZigBee specification;

FIG. 7B shows the format of the Frame Control filed shown in FIG. 7A;

FIG. 7C illustrates the specific configuration of the Frame Control field for data frame, according to embodiments of the present invention;

FIG. 8A depicts general ZigBee network layer frame format;

FIG. 8B shows the format of the Frame Control filed shown in FIG. 8A;

FIG. 8C illustrate the specific configuration of the Frame Control field for data frame, according to embodiments of the present invention;

FIG. 9A depicts general ZigBee application support sublayer (APS) frame format;

FIG. 9B shows the format of the Frame Control filed shown in FIG. 9A;

FIG. 9C shows general ZigBee APS data frame format;

FIG. 9D illustrate the specific configuration of the Frame Control field for APS data frame, according to embodiments of the present invention;

FIG. 11 illustrates the active ZigBee neighbor discovery protocol by Wi-Fi device using cross-technology communications, according to embodiments of the present invention;

FIG. 14 shows ZigBee symbol to chip sequence mapping;

DETAILED DESCRIPTION

Figure 1:
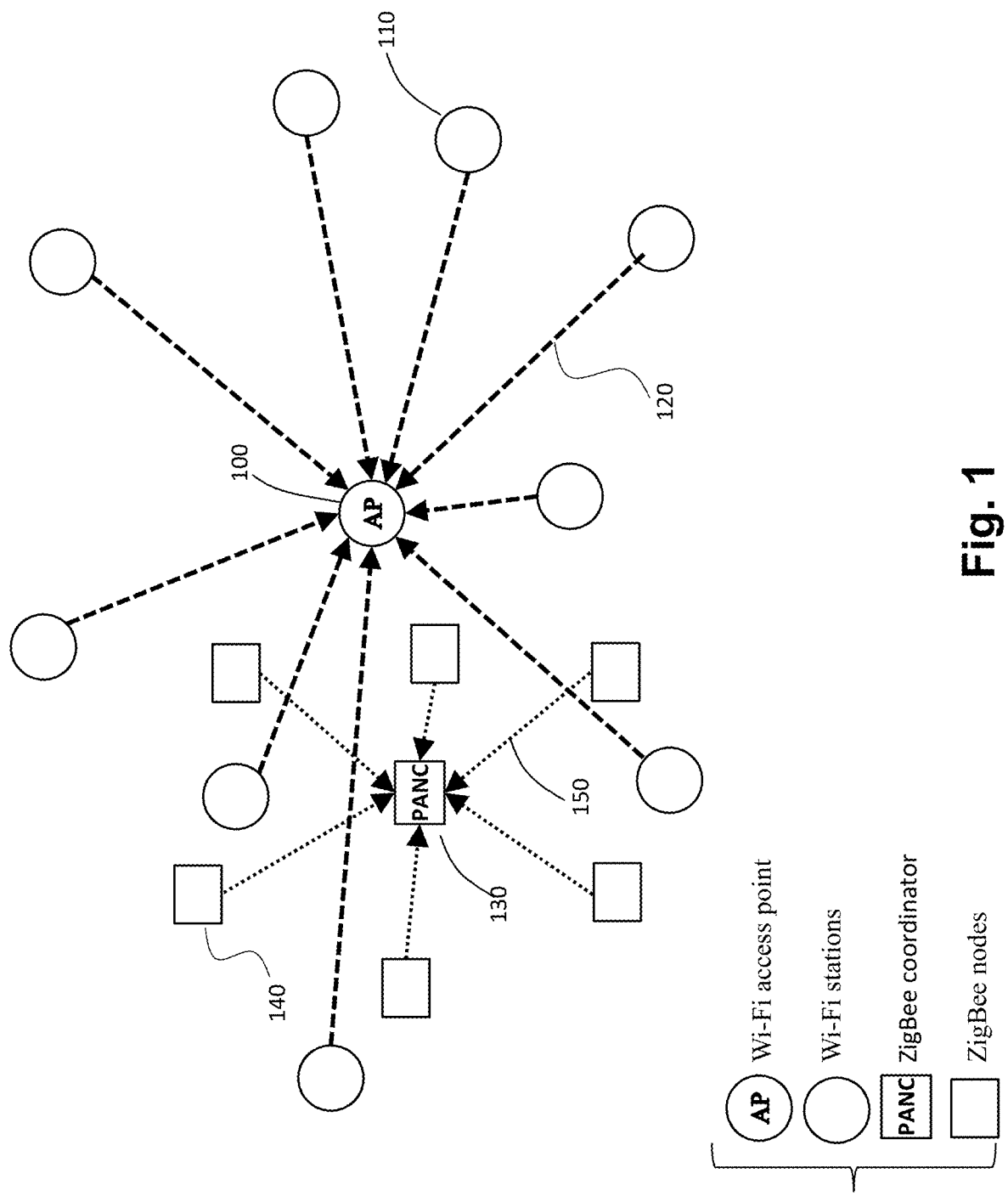
FIG. 1 is schematic of the coexisting Wi-Fi network and ZigBee network, according to embodiments of the present invention.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

There are many different wireless communication technologies. The embodiments of the invention take Wi-Fi and ZigBee technologies as example wireless technologies to illustrate the heterogeneous neighbor discovery via cross-technology communication. However, the provided cross-technology neighbor discovery technologies can be applied to other wireless technologies. In the present invention, a Wi-Fi device actively discover its ZigBee neighbors. There is no modification required on ZigBee device. In other words, the invented method can be directly applied to discover commercial ZigBee devices. Only minor software update is needed for Wi-Fi device.

Need of Cross-Technology Neighbor Discovery

It is critical to note that network layer technologies are not able to perform physical layer functions. As a result, the conventional network layer neighbor discover mechanisms cannot discover heterogeneous neighbors. Therefore, to discover heterogeneous neighbors, physical layer technologies are needed. To that end, physical layer cross-technology communication can be developed to discover heterogeneous neighbors.

Physical cross-technology communication (CTC) is an emerging technique that enables direct communication across different wireless technologies, e.g., Wi-Fi and ZigBee. It is a promising approach for efficient coordination and cooperation to mitigate the interference among coexisting heterogeneous wireless systems. It can offer a new direction for neighbor discovery and is capable of discovering the types of neighbors, number of neighbors and locations of neighbors.

Existing physical-layer CTC (PHY-CTC) can achieve a high data rate. However, the communication function modification requirement causes channel incompatible to commercial devices, making it hard to be deployed in current wireless systems. Therefore, PHY-CTC needs to be compatible with commercial devices, i.e., no hardware/firmware modification is required to commercial devices. The embodiments of the invention provide PHY-CTC between Wi-Fi and ZigBee technologies for cross-technology neighbor discovery.

Basic Features of ZigBee

ZigBee uses IEEE 802.15.4 MAC and PHY protocols and defines its own network protocol instead of using standard IP protocol. For example, ZigBee uses 16-bit network address instead of IP address. Besides short address, ZigBee uses 64-bit IEEE address. ZigBee protocol defines its own device discovery mechanism instead of using IP neighbor discovery mechanism. To support sleeping devices in device discovery, ZigBee also defines the Primary Discovery Cache Devices. Most importantly, ZigBee defines passive ACK mechanism for data broadcast communication.

However, ZigBee device discovery is based on IP neighbor discover. More specifically, the discovering device knows 16-bit network address or 64-bit IEEE address of a neighbor and wants to know the 64-bit IEEE address or 16-bit network address of that neighbor. In other words, instead of discovering unknown neighbors, the mechanism uses one type of address of the known neighbor to acquire another type of address. The NWK_addr_req frame is used to acquire the 16-bit network address of the neighboring device using the known IEEE address of the neighboring device. The destination addressing on this frame can be unicast or broadcast to all devices for which macRxOnWhenIdle=TRUE. The IEEE_addr_req frame is used to acquire the 64-bit IEEE address of the neighboring device using the known 16-bit network address of the neighboring device. The destination addressing on this frame must be unicast. As a result, neighbor discovery in ZigBee is still the address acquisition instead of neighbor discovery. At network layer, ZigBee device discovery mechanism is not able to discover heterogeneous neighbors.

The Primary Discovery Cache Devices such as ZigBee coordinator and ZigBee router are useful in device discovery. These devices are themselves discoverable and provide services to upload and store discovery information on behalf of sleeping ZigBee end devices. Additionally, these devices respond to discovery requests on behalf of the sleeping ZigBee end devices. Each Primary Discovery Cache Device must be either a ZigBee Router or the ZigBee coordinator. Within each ZigBee network consisting of sleeping ZigBee end devices, some ZigBee Routers or the ZigBee coordinator can be designated as Primary Discovery Cache Devices. The ZigBee end devices which intend to sleep may upload and store their network addresses, IEEE addresses, etc. onto Primary Discovery Cache Devices selected by the ZigBee end devices to permit device discovery operations on behalf of these sleeping devices. ZigBee coordinator and routers designated as Primary Discovery Cache Devices shall respond to discovery requests on behalf of sleeping ZigBee end devices.

An important feature in ZigBee is the passive ACK mechanism for broadcast data frame. When a ZigBee coordinator or router receives a broadcast data frame, instead of sending a MAC level ACK, it will rebroadcast the received data frame. This rebroadcast serves as passive ACK. This feature will be used by the embodiments of the invention to discover ZigBee neighbors by a Wi-Fi device.

Based on the functions, ZigBee devices are divided into three categories: 1) ZigBee coordinator: an IEEE 802.15.4 PAN coordinator that manages the ZigBee network; 2) ZigBee router: an IEEE 802.15.4 full function device (FFD) participating in a ZigBee network, which is not the ZigBee coordinator but may act as an IEEE 802.15.4 coordinator within its personal operating space, that is capable of routing messages between devices and supporting associations and 3) ZigBee end device: an IEEE 802.15.4 reduced function device (RFD) or FFD participating in a ZigBee network, which is neither the ZigBee coordinator nor a ZigBee router.
Active ZigBee Neighbor Discovery Protocol In the present invention, Wi-Fi technology and ZigBee technology are used as example technologies to illustrate the active heterogeneous neighbor discovery via cross-technology communication (CTC) mechanism, in which a Wi-Fi device such as a Wi-Fi AP or a Wi-Fi station actively discovers the neighboring ZigBee devices, where a ZigBee device can be a ZigBee coordinator or a ZigBee router or a ZigBee end device.

FIG. 1 shows an example of the coexisting Wi-Fi network and ZigBee network. The Wi-Fi network consists of a Wi-Fi access point (AP) 100 and Wi-Fi stations 110. Wi-Fi network communicates using Wi-Fi link 120. The ZigBee network consists of a ZigBee personal area network coordinator (PANC) 130 and ZigBee nodes 140. The ZigBee network communicates using ZigBee link 150 that is different from Wi-Fi link 120.

Figure 2:
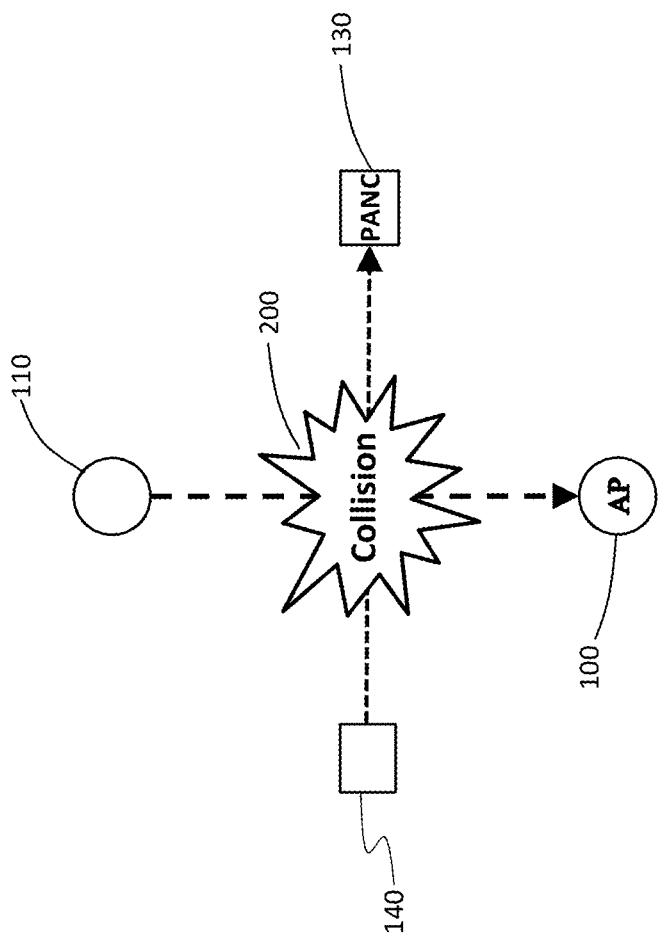
FIG. 2 shows an example packet transmission collision in the coexisting Wi-Fi network and ZigBee network.

The coexistence of Wi-Fi network and ZigBee network indicates that two networks are co-located and operate on overlapping or shared frequency bands. Therefore, when two networks transmit simultaneously, the transmission collision is possible. FIG. 2 shows an example in which the transmission from Wi-Fi station 110 to Wi-Fi AP 100 collides with the transmission from ZigBee node 140 to ZigBee PANC 130. Therefore, two networks interfere with each other. Accordingly, it is critical if two networks can coordinate with each other to mitigate the mutual interference.

Figure 3:
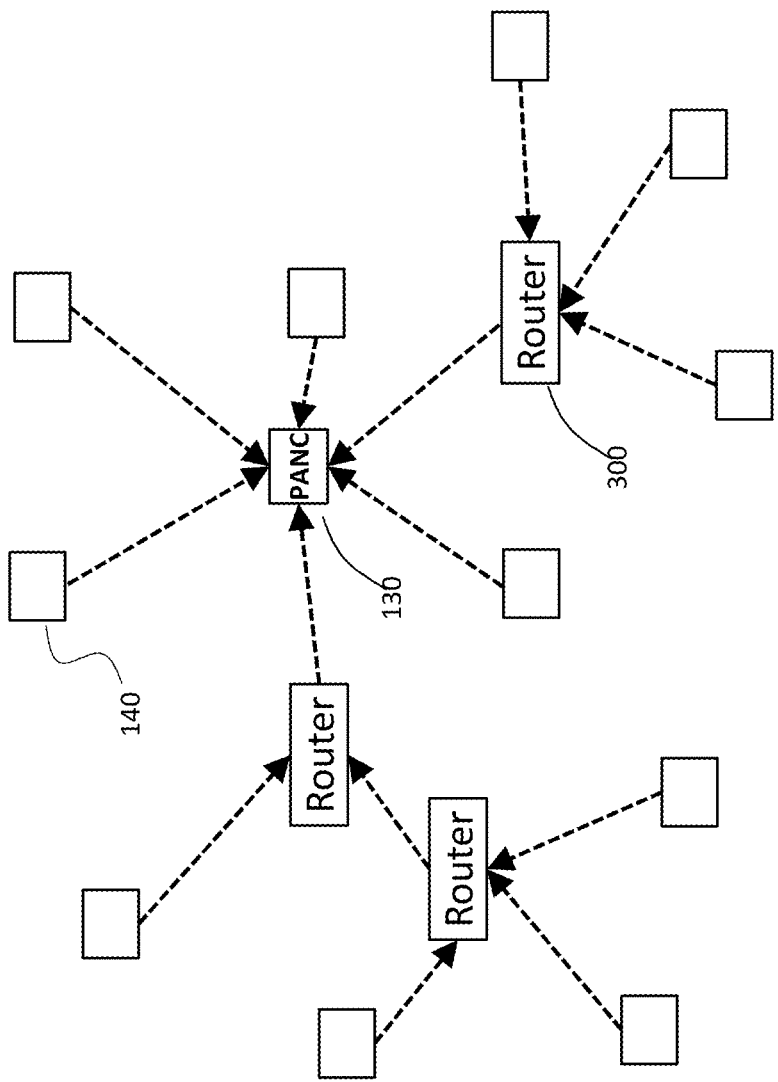
FIG. 3 shows an example of ZigBee network consisting of ZigBee coordinator, ZigBee routers and ZigBee end devices, according to embodiments of the present invention.

A wireless network can be a multi-hop network, which is a typical case for ZigBee network due to the shorter communication range of ZigBee device. FIG. 3 shows a typical ZigBee network consisting of ZigBee coordinator 130, ZigBee nodes 140 and ZigBee routers 300. The ZigBee routers extends network, relay data and perform some of coordinator functions. Most importantly, both ZigBee coordinator and routers perform passive ACK for the broadcasted data frame by rebroadcasting the received data frame, cache the information of the associated end devices and respond to the device discovery request on behalf of the sleeping end devices.

Figure 4:
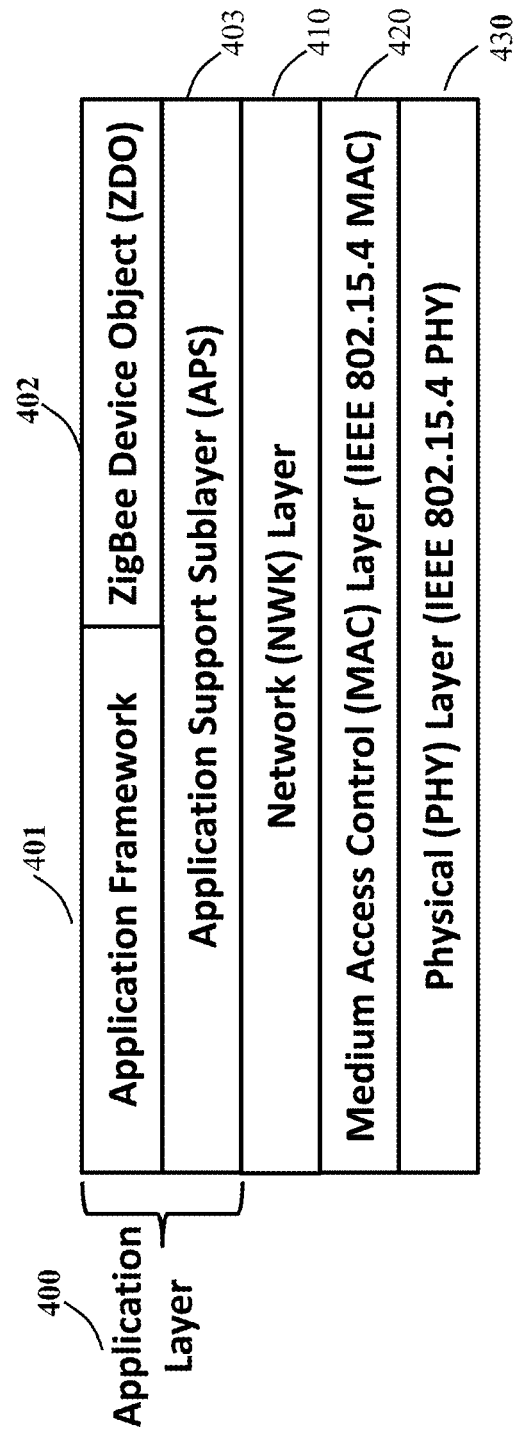
FIG. 4 shows ZigBee protocol stack architecture.

FIG. 4 shows ZigBee protocol stack architecture, which includes application layer 400, network (NWK) layer 410, MAC layer 420 and PHY layer 430. The application layer 400 consists of two sublayers. The first sublayer is application object layer that consists of application framework 401 and ZigBee device object (ZDO) 402. The second sublayer is application support sublayer (APS) 403. ZigBee defines its own network layer 410. MAC layer 420 adopts IEEE 802.15.4 MAC and PHY layer 430 adopts IEEE 802.15.4 PHY. Each layer defines its own frame format.

Figure 5:
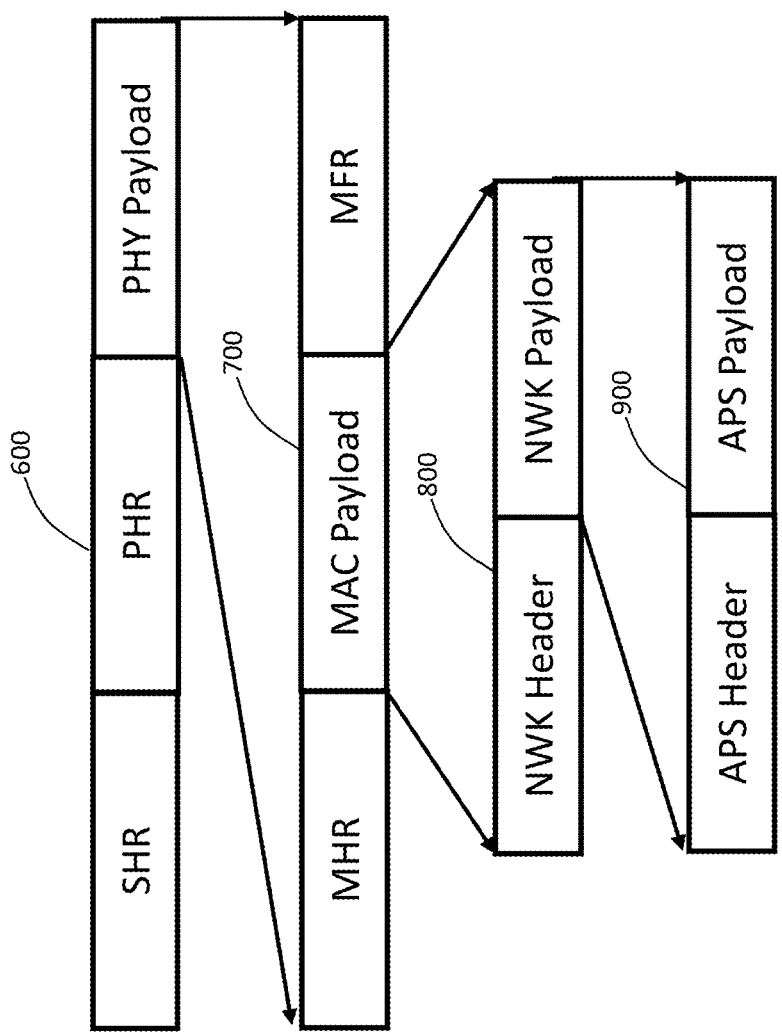
FIG. 5 shows ZigBee frame architecture.
Figure 6A:
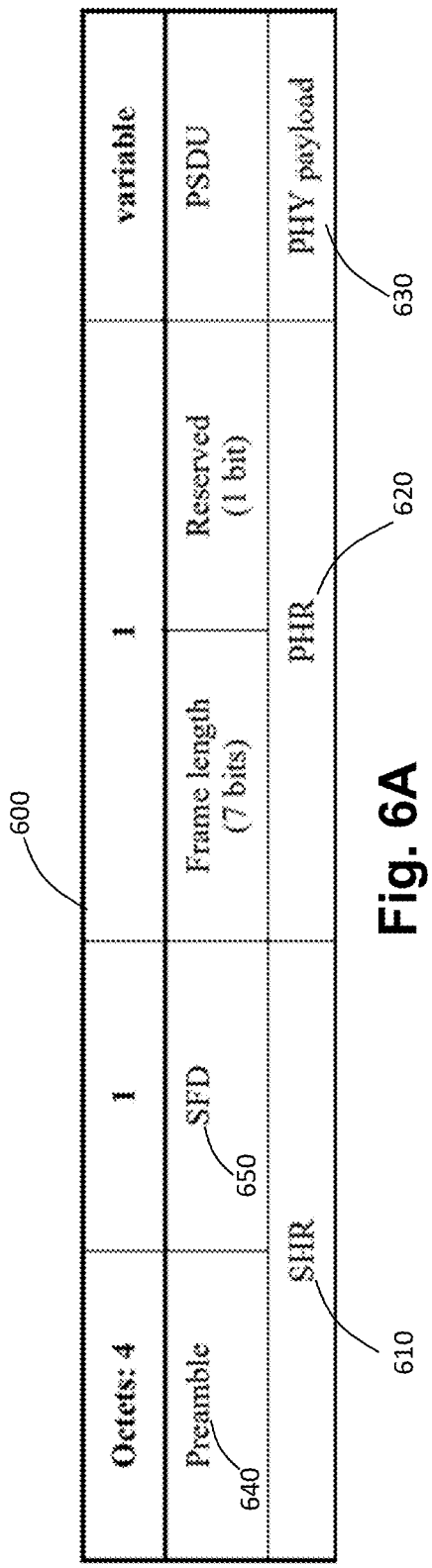
FIG. 6A depicts general IEEE 802.15.4-2003 physical layer data unit format, which is adopted by ZigBee specification.

FIG. 5 illustrates ZigBee frame architecture starting from PHY layer frame format to application layer frame. ZigBee PHY layer frame 600 includes synchronization header (SHR) field, PHY header (PHR) field and PHY payload field as shown in FIG. 6A. PHY payload contains MAC layer frame 700 includes MAC header (MHR) field, MAC payload field and MAC footer (MFR) field as shown in FIG. 7A. The MAC payload contains network layer frame 800 includes network header (NWK Header) field and network payload (NWK Payload) field as shown in FIG. 8A. Similarly, NWK payload contains application layer frame 900 includes APS header field and APS payload field as shown in FIG. 9A.

To realize the cross-technology communication between Wi-Fi and ZigBee, a Wi-Fi device that performs discovery needs to perform physical layer cross-technology communication (PHY-CTC) with ZigBee devices. To do so, specific frame configurations are needed. The present invention provides such frame configurations.

Figure 6B:
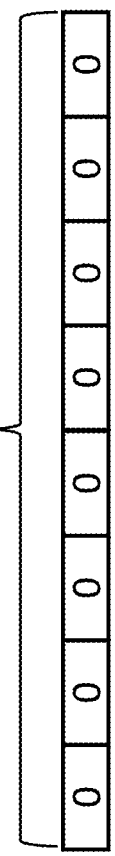
FIG. 6B shows the ZigBee specific configuration of the Preamble filed for IEEE 802.15.4-2003 physical layer data unit shown in FIG. 6A.
Figure 6C:
FIG. 6C shows the ZigBee specific configuration of the start-of-frame delimiter (SFD) field for IEEE 802.15.4-2003 physical layer data unit shown in FIG. 6A.

FIG. 6A shows the general IEEE 802.15.4-2003 PHY layer frame format 600, which is adopted by ZigBee. The PHY frame 600 consists of a synchronization header (SHR) field 610, PHY header (PHR) field 620 and PHY payload field 630. ZigBee protocol specifies 4-bit symbol, i.e., a ZigBee symbol is of 4 bits in length. The SHR field 610 includes a 4-octest Preamble field 640 and a 1-octet SFD (start-of-frame delimiter) field 650. ZigBee defines Preamble field 640 as eight 4-bit ZigBee symbol 0s as shown in FIG. 6B. In other words, the 4-octet Preamble field is set to 0. FIG. 6C shows ZigBee configuration of the SFD field 650, where SFD field is set two ZigBee symbols A and 0 as shown in FIG. 6C. The PHR field 620 is 1 octet divided into a 7-bit Frame length field and 1-bit Reserved field, where Frame length field is dynamically configured based on actual frame length and Reserved field is set to 0. The PHY payload field 630 contains a variable length PSDU (PHY service data unit), which contains IEEE 802.15.4-2003 MAC frame shown in FIG. 7A.

FIG. 7A shows the general IEEE 802.15.4-2003 MAC frame format 700, which is adopted by ZigBee. The MAC data frame 700 consists of MHR (MAC header) field 710, MAC payload field 720 and MFR (MAC footer) field 730. The MHR field 710 includes 2-octet Frame control field 740, 1-octet Sequence number field and variable length Addressing fields, which can include 0/2-octet Destination PAN identifier, 0/2/8-octet Destination address, 0/2-octet Source PAN identifier and 0/2/8-octet Source address depending on Frame control field configuration.

The format of Frame control 740 is specified in FIG. 7B 750, which is further divided into nine fields. Depending on frame type, there are different configurations for the fields shown in FIG. 7B. To perform heterogeneous neighbor discovery, the present invention provides the data frame configuration 760 shown in FIG. 7C, where 3-bit Frame type field is set to 001 to indicate data frame, 1-bit Security enabled field is set to 0 to indicate that security is not enabled, 1-bit Frame pending field is set to 0 to indicate no pending frame, 1-bit Ack. Request field is set to 0 to indicate no MAC Acknowledgement request, 1-bit Intra-PAN field is set to 1 to indicate that the frame is sent within same network, 3-bit Reserved field is set to 000 by default, 2-bit Dest. Addressing mode field is set to 10 to indicate that 16-bit network address is used, 2-bit Reserved field is set to 00, 2-bit Source addressing mode field is set to 00 to indicate no source address included. It is critical to point out that Wi-Fi transmitter does not require MAC layer Acknowledgement so that ZigBee passive ACK mechanism can be used, and Wi-Fi transmitter is not a ZigBee node and therefore, it does not have any ZigBee address.

1-octet Sequence number field start with 0 and increments by for each transmission. Because 2-bit Dest. Addressing mode field is set to 10, 2-octet Destination PAN identifies is set to 0xFFFF to indicate the broadcast PAN identifier and 2-octet Destination address is set to 16-bit broadcast address 0xFFFF. Also, because 2-bit Source addressing mode field is set to 00, Source PAN identifier and Source address are not included. 2-octet MFR field contains FCS (frame check sequence) that is dynamically computed at frame construction time. Finally, the variable length MAC payload field contains ZigBee network frame 800, which is considered as data frame by MAC layer, as shown in FIG. 8A or MAC layer control frame or MAC layer command frame.

FIG. 8A shows the general ZigBee network (NWK) frame format 800, which consists of NWK Header field 810 and Payload field 820. The NWK Header 810 in turn consists of nine fields: 2-octet Frame control 830, 2-octet Destination address, 2-octet Source address, 1-octet Radius, 1-octet Sequence number, 0/8-octet Destination IEEE Address, 0/8-octet Source IEEE Address, 0/1-octet Multicast control and variable length Source route subframe.

The format of Frame control 830 is specified in FIG. 8B, which is further divided into ten fields 840. Depending on frame type, there are different configurations for the fields shown in FIG. 8B. To perform heterogeneous neighbor discovery, the present invention provides the data frame configuration 850 shown in FIG. 8C, where 2-bit Frame type field is set to 00 to indicate data frame, 3-bit Protocol version field is set to 001 to indicate the original version, 2-bit Discover route field is set to 00 to indicate suppress route discovery, 1-bit Multicast flag field is set to 0 to indicate broadcast frame, 1-bit Security field is set to 0 to indicate no security enabling, 1-bit Source Route field is set to 0 to indicate no source route, 1-bit Destination IEEE Address field is set to 0 to indicate no IEEE address included, 1-bit Source IEEE Address field is set to 0 to indicate no source IEEE address included, 1-bit End Device Initiator field is set to 0 to indicate no network parent information included and 2-bit Reserved field is set to 00 by default.

2-octet Destination address field is set to 0xFFFF for broadcast frame or specific address for unicast frame. 2-octet Source address field is set to 0xFFFF because Wi-Fi device has no ZigBee network address. 1-octet Radius field is set to 1 for broadcast data frame so that ZigBee coordinator and routers will rebroadcast the data frame or to 0 so that the frame is not rebroadcasted. 1-octet Sequence number field starts with 0 and increments by 1 for each additional transmission. Destination IEEE Address and Source IEEE Address are not included because both Destination IEEE Address field and Source IEEE Address field are set to 0 in Frame control filed 830. Multicast control field is not included because the broadcast frame. Source route subframe is not included because Source Route field is set to 0 in Frame control 830. Finally, Frame payload contains ZigBee Application Support Sublayer (APS) frame 900, which is considered as data frame by NWK layer, as shown in FIG. 9A or NWK layer data frame or NWK layer command frame.

FIG. 9A shows general ZigBee APS frame format 900, which includes APS header field 910 and APS payload field 920. APS header field includes 1-octet Frame control field 930, variable length Addressing fields, 1-octet APS counter and 0/variable length Extended header. Frame control field 930 is shown in FIG. 9B, where 2-bit Frame type is 00 for data, 01 for command, 10 for Acknowledgement and 11 for Inter-PAN APS. 2-bit Delivery mode is 00 for normal unicast delivery, 01 for Reserved, 10 for broadcast and 11 for group addressing. 1-bit Ack. format field is set to 0 for data frame acknowledgement and 1 for APS command frame acknowledgement. 1-bit Security field is set to 0 for no security and 1 for security. 1-bit Ack. request field is set to 1 for acknowledgement request and to 0 for no acknowledgement. This sub-field is set to 0 for all frames that are broadcast or multicast. 1-bit Extended header present field is set to 1 if the extended header is included and to 0 if no extended header.

The Addressing fields consists of 0/1-octet Destination endpoint that specifies the endpoint of the final recipient of the frame, 0/2-octet Group address that is only present for group delivery, 0/2-octet Cluster identifier that specifies the identifier of the cluster to which the frame relates, 0/2-octet Profile identifier that ZigBee profile identifier for which the frame is intended and 0/1-octet Source endpoint that specifies the endpoint of the initial originator of the frame.

1-octet APS counter field starts with 0 and increments by 1 for each new transmission. The Extended header contains an extender header sub-frame if the Extended header present is 1 and does not present otherwise. Finally, variable length APS payload field 920 contains frame payload.

The APS frame 900 can be simplified depending frame type. For example, for data frame, APS frame 900 is simplified into data frame 940 as shown in FIG. 9C. For the heterogeneous neighbor discovery purpose, the present invention provides the configuration 950 of Frame control field 930 for data frame as shown in FIG. 9D. The Destination endpoint is set to 0xFF so that frame is delivered to all endpoints. Group address is not included because Delivery mode is 00. Cluster identifier is set to 0x0001 for IEEE_addr_req frame. Profile identifier is set to public ID 0x0107 for telecom application. Source endpoint is set 0x01 to indicate that the frame originated from an application operating on that endpoint. APS counter starts with 0 and increments by 1 for each new transmission. Extend header is not included because Extended header present bit is set to 0. For heterogeneous neighbor discovery, Frame payload contains IEEE address request IEEE_addr_req service command as shown in FIG. 10A.

Figure 10A:
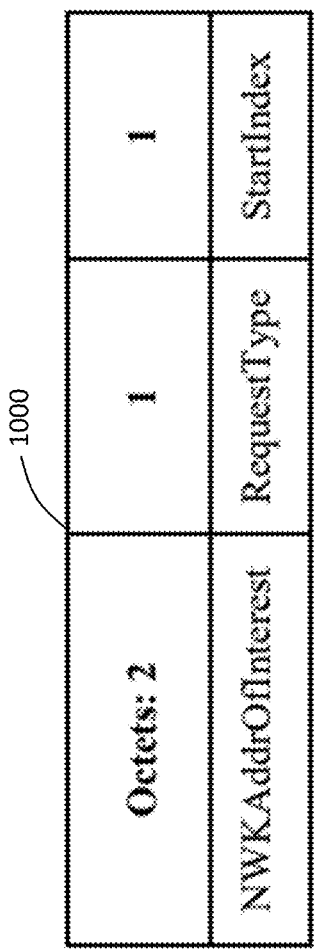
FIG. 10A shows ZigBee IEEE Address Request frame format.

FIG. 10A shows the format of IEEE_addr_req command 1000, which consists of 2-octet NWKAddrOfInterest field, 1-octet RequestType and 1-octet StartIndex. The NWKAddrOfInterest field can be set to network address of ZigBee coordinator or router. The RequestType field is set to 0x01 to indicate extended response needed, which means that ZigBee coordinator or router sends back its own IEEE address and a list of 16-bit network addresses of end devices associated with the ZigBee coordinator or router in ZigBee IEEE_addr_rsp frame. StartIndex starts is set to 0 to include all network address.

For the MAC Header 710 configuration, Destination PAN identifier is set to PAN identifier obtained from rebroadcasted data frame by ZigBee coordinator or router, Destination address is set to the 16-bit network address of the ZigBee coordinator or router obtained from rebroadcasted data frame, Source PAN identifier is set to same as Destination PAN identifier, and Source address is set to any 16-bit address that is different from the Destination address. Since Wi-Fi device scans all ZigBee transmissions. Therefore, the source address does not matter.

Figure 10B:
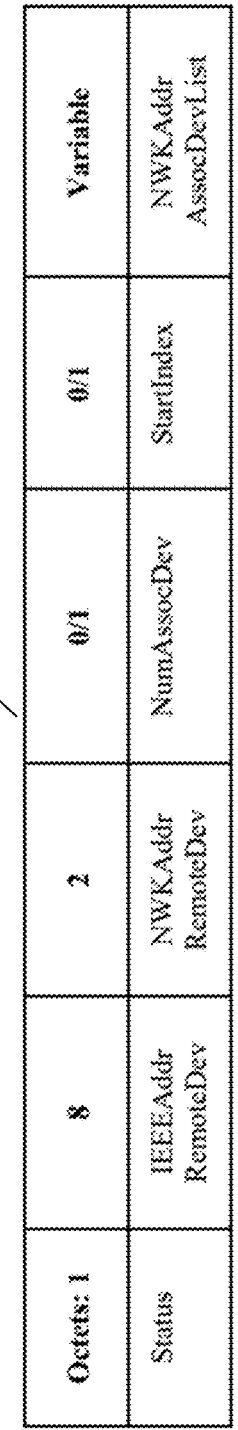
FIG. 10B illustrate ZigBee IEEE Address Response frame format.

In responding to receipt of IEEE_addr_req command, the recipient will send back IEEE address response (IEEE_addr_rsp) service frame as shown in FIG. 10B.

FIG. 10B shows format of IEEE_addr_rsp frame 1020, where 1-octet Status field indicates if the requested information is included, 8-octet IEEEAddrRemoteDev is the IEEE address of ZigBee coordinator or router to which the IEEE_addr_req command is sent, 2-octet NWKAddrRemoteDev is the network address of ZigBee coordinator or router to which the IEEE_addr_req command is sent, 0/1-octet NumberAssocDev indicates the number of ZigBee end devices associated with the ZigBee coordinator or router and this field is included if the Status is SUCCESS, 0/1-octet StartIndex is the starting index into the list of associated end devices and this field is included if Status is SUCCESS, variable length NWKAddrAssocDevList contains a list of 16-bit network addresses of end devices associated to ZigBee coordinator or router and this field is included if Status is SUCCESS.

FIG. 11 shows the active ZigBee neighbor discovery process by a Wi-Fi device 1100, which can be Wi-Fi AP or Wi-Fi station. To start active ZigBee neighbor discovery, the Wi-Fi device 1100 broadcasts an emulated ZigBee NWK layer data frame without payload at step (1). After broadcasting, Wi-Fi device switches to spectral scan mode to listen for the response from ZigBee neighbors. The broadcasted data frame will be received by all ZigBee neighbors. Even ZigBee end device may not respond to the received frame, ZigBee coordinator and ZigBee routers will perform passive acknowledgement by rebroadcasting the received data frame. The rebroadcasting will be performed based on CSMA/CA mechanism. Therefore, the order of rebroadcasting is random. FIG. 11 shows an order in which ZigBee coordinator rebroadcasts first followed by ZigBee routers. As a result, ZigBee coordinator 1110 rebroadcasts the data frame at step (2A) and ZigBee routers rebroadcast the data frame at step (2B). Since Wi-Fi device is in spectral scan mode, it will decode all rebroadcasts according to mechanism described in next section. From the received rebroadcasts, Wi-Fi device obtains network addresses of ZigBee coordinator and routers because source address is always present in ZigBee frame NWK Header 810 as shown in FIG. 8A. In other words, the Wi-Fi device has discovered ZigBee coordinator and routers already. Upon obtaining network addresses of ZigBee coordinator and routers, the Wi-Fi device inquires ZigBee end devices. To do so, the Wi-Fi device transmits an emulated ZigBee IEEE_addr_req frame to ZigBee coordinator at step (3A) with the RequestType field set to 0x01. After frame transmission, the Wi-Fi device switches to spectral scan mode to listen for the response from ZigBee coordinator. Upon receiving the IEEE_addr_req frame, ZigBee coordinator responds with a ZigBee IEEE_addr_rsp frame at step (3B), which contains ZigBee coordinator's IEEE address and a list of network addresses of ZigBee end devices that are associated with the ZigBee coordinator. Upon receiving the IEEE_addr_rsp frame from ZigBee coordinator, the Wi-Fi devices has discovered all ZigBee end devices associated with ZigBee coordinator. The Wi-Fi device then perform same operation at step (4A) to each ZigBee routers and receives IEEE address of each ZigBee router and network addresses of ZigBee end devices associated with that router at step (4B). To this point, the Wi-Fi device has discovered all nodes in a ZigBee network. The Wi-Fi device can acquire IEEE address of each ZigBee end device by using IEEE_addr_req and IEEE_addr_rsp frame exchange at steps (5A), (5B), (6A) and (6B).

Cross-Technology Neighbor Discovery Between Wi-Fi and ZigBee

The present provides cross-technology neighbor discovery technology named as X-Disco, which the first cross-technology neighbor discovery mechanism, for a commodity Wi-Fi device to discover commodity ZigBee neighbors, without any modification on the hardware or firmware. X-Disco enables a commodity Wi-Fi device to trigger responses, containing ZigBee neighbor information, from the ambient ZigBee coordinator and routers. Through exploring the Wi-Fi PHY-layer information accessible by commodity Wi-Fi devices, X-Disco decodes the responded ZigBee packets and obtains the ZigBee neighbor information.

At a high level, the X-Disco device (Wi-Fi device) transmits a ZigBee Device and Service Discovery request message to the ambient ZigBee coordinator and routers to fetch the ZigBee neighbor information. Consequently, a ZigBee coordinator or router replies with a list of the network address of each associated ZigBee neighbor in the response message, from which the ZigBee neighbor information is decoded and obtained by the X-Disco device. To overcome the challenge of PHY-layer incompatibility between commodity Wi-Fi and ZigBee, X-Disco device (i) employs the recently proposed cross-technology communication (CTC) technologies that allow a commodity Wi-Fi device to directly send ZigBee messages to the commodity ZigBee devices through signal emulation without any modification on hardware or firmware at Wi-Fi device and (ii) exploits the fine-grained PHY-layer information directly accessible by Wi-Fi driver to decode the responded ZigBee message at commodity Wi-Fi. To address the challenge of transparency to the ZigBee devices, X-Disco takes advantages of the existing ZigBee Device and Service Discovery mechanism in ZigBee protocol, specifying that a ZigBee coordinator shares the ZigBee neighbor information upon the reception of a ZigBee Device Discovery request, which is transmitted at commodity Wi-Fi via CTC at X-Disco device. Thus, X-Disco is entirely compatible with both hardware and protocols of Wi-Fi and ZigBee, incurring zero cost at deploying X-Disco into practice.

X-Disco is built with three major technical highlights: (i) ZigBee Symbol Extraction, (ii) ZigBee Coordinator Detection, and (iii) Neighbor Information Acquisition, where the compatibility with the hardware and protocols is the key. ZigBee Symbol Extraction ensures that all ZigBee messages, especially ZigBee neighbor information, are reliably decoded at commodity Wi-Fi to overcome PHY-layer incompatibility challenge. ZigBee Coordinator Detection and Neighbor Information Acquisition emulate ZigBee Device Discovery request using commodity Wi-Fi to overcome the transparency challenge.

Fine-Grained PHY-Layer Information at Wi-Fi

The commodity Wi-Fi device exposes fine-grained PHY-layer information such as Channel State Information (CSI)

and Fast Fourier Transformation (FFT) magnitude of the received signal to the Wi-Fi driver. As a proprietary mode supported by many open-source Wi-Fi drivers and commodity Wi-Fi devices, Spectral Scan mode enables a commodity Wi-Fi device to obtain the FFT magnitude of the received signal, regardless of the type of received signal. Compared to the CSI, which is only extracted per Wi-Fi packet, FFT magnitude could be continuously collected from the received signal at Wi-Fi Spectral Scan. In other words, if a ZigBee signal arrives at the commodity Wi-Fi device, Spectral Scan provides a series of FFT magnitudes, from which X-Disco extracts the data modulated in the ZigBee signal. However, it is still quite challenging to decode the ZigBee signal at a commodity Wi-Fi device because ZigBee modulates information in the phase, whereas Wi-Fi Spectral Scan only provides magnitude without phase information.

X-Disco in a Nutshell

Figure 12:
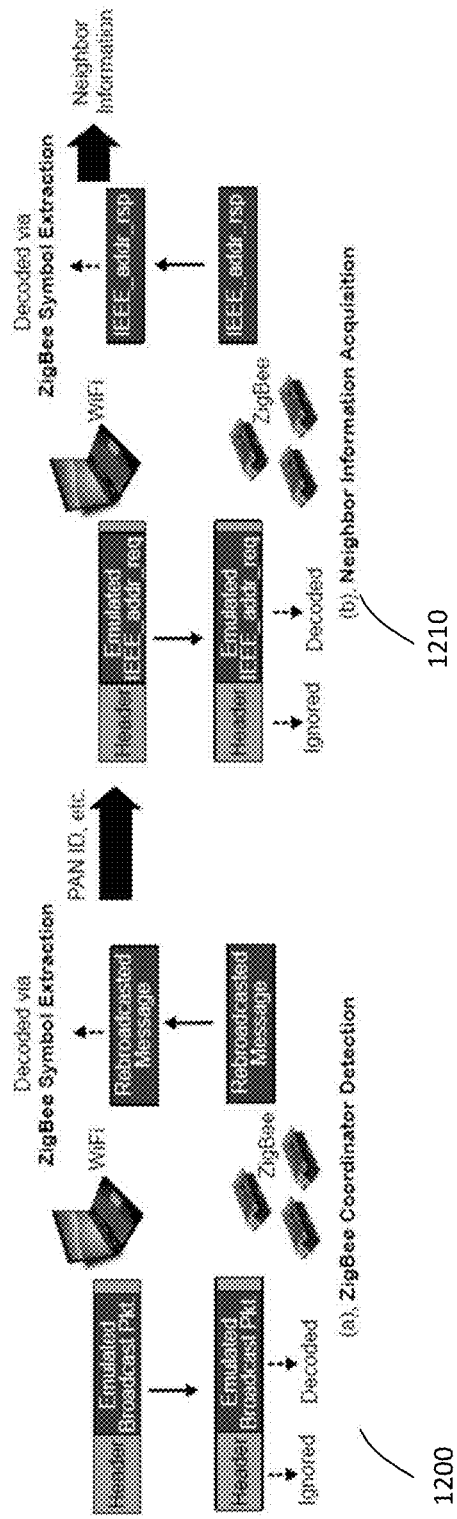
FIG. 12 shows basic operations of X-Disco device, wherein X-Disco device first discovers the ambient ZigBee coordinator and routers in Step (a) and then fetches the ZigBee neighbor information in Step (b), according to embodiments of the present invention.

X-Disco is a two-step approach designed for fetching the ZigBee neighbor information from the ambient ZigBee coordinator and routers. As shown in FIG. 12, in Step (a) 1200 ZigBee Coordinator Detection, an X-Disco device (commodity Wi-Fi device) transmits a customized Wi-Fi packet, that emulates a ZigBee broadcast frame, and then switches to Spectral Scan mode. Upon the arrival of the customized Wi-Fi packet at the ambient ZigBee coordinator and routers, the Wi-Fi signal is recognized as a legitimate ZigBee broadcast frame, triggering the ZigBee coordinator and routers to rebroadcast the emulated frame as specified in ZigBee protocol. The rebroadcasted frames yield special patterns at the FFT magnitude, collected by Wi-Fi Spectral Scan, from which the frames are decoded in ZigBee Symbol Extraction described later and the ZigBee network information, such as PAN ID and network address, is obtained by the X-Disco device. In Step (b) 1210, Neighbor Information Acquisition, by leveraging the ZigBee network information, the X-Disco device transmits an IEEE_addr_req frame (ZigBee Device and Service Discovery request) via CTC to enforce the ZigBee coordinator and routers to share the ZigBee neighbor information. Consequently, the ZigBee coordinators respond to the X-Disco device's request with an IEEE_addr_rsp frame (ZigBee Device and Service Discovery response), containing a list of the network addresses of the associated ZigBee neighbors. As the foundation of X-Disco, ZigBee Symbol Extraction enables the X-Disco device to decode the ZigBee frames using the FFT magnitude collected at Wi-Fi Spectral Scan.

ZigBee Signal Interpretation at Wi-Fi Device

How to interpret the ZigBee signal at Wi-Fi Spectral Scan using the FFT magnitude without phase information is challenging.

ZigBee Transmitter

Figure 13:
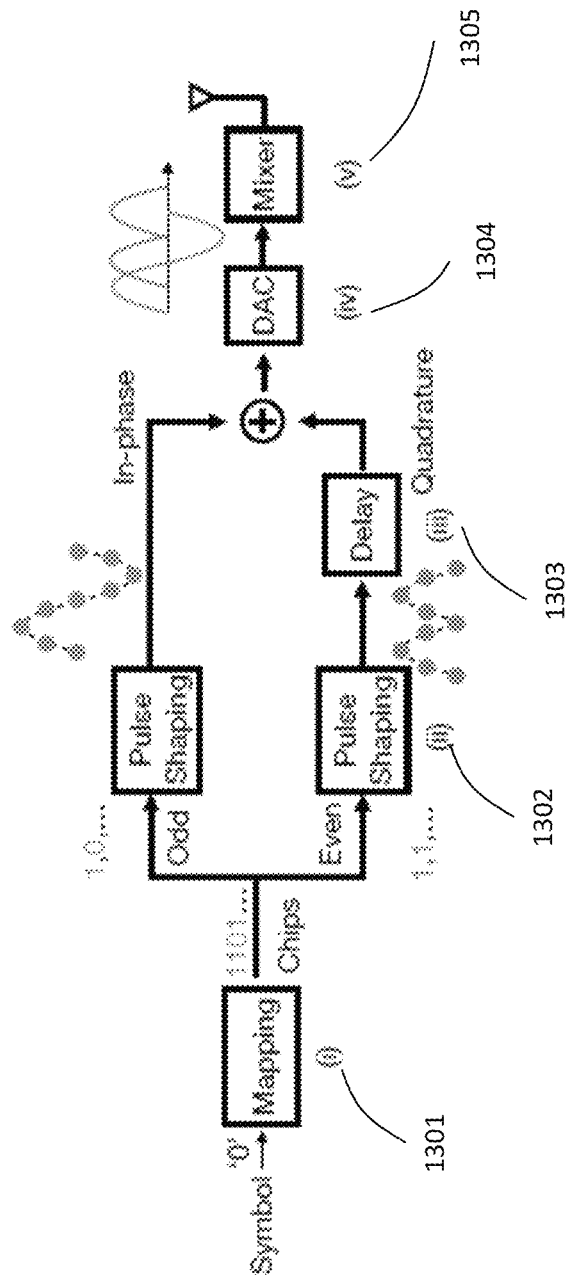
FIG. 13 illustrate physical layer operations of a ZigBee transmitter.

The transmission of a ZigBee packet starts with assembling every four bits into one ZigBee symbol ('0'-'F'), which is the basic unit to carry information in ZigBee. As illustrated in FIG. 13, the ZigBee PHY Layer first converts the input ZigBee symbol into a unique and pseudo-random 32-bit chip sequence according to the mapping Table shown in FIG. 14 in Step (i) 1301. Then, the chips '1' and '0' are shaped into positive and negative 1 μs half-sine pulses via Offset Quadrature Phase Shift Keying (OQPSK) in Steps (ii) 1302 and (iii) 1303. Specifically, the chips on the odd indices generate the in-phase signal. Delayed by 0.5 μs in Step (iii), the pulses, corresponding to the chips on the even indices, are referred to as the quadrature signal. After the in-phase (I) and quadrature signal (Q) are merged, the digital-to-analog converter (DAC) translates the I/Q (discrete) signal into a continuous analogy baseband signal in Step (iv) 1304, where the 1 μs half-sine pulses correspond to 1 MHz pulse rate in both in-phase and quadrature, indicating 2 MHz bandwidth. Now, a ZigBee symbol is converted to a series of sinusoidal waves, which express 0/1 chip information in the phase of the baseband signal while the magnitude is identical over the time. Finally, in Step (v) 1305, the mixer shifts the 2 MHz baseband signal to the ZigBee's carrier frequency (passband), which is further fed to the antenna for transmission.

Figure 15:
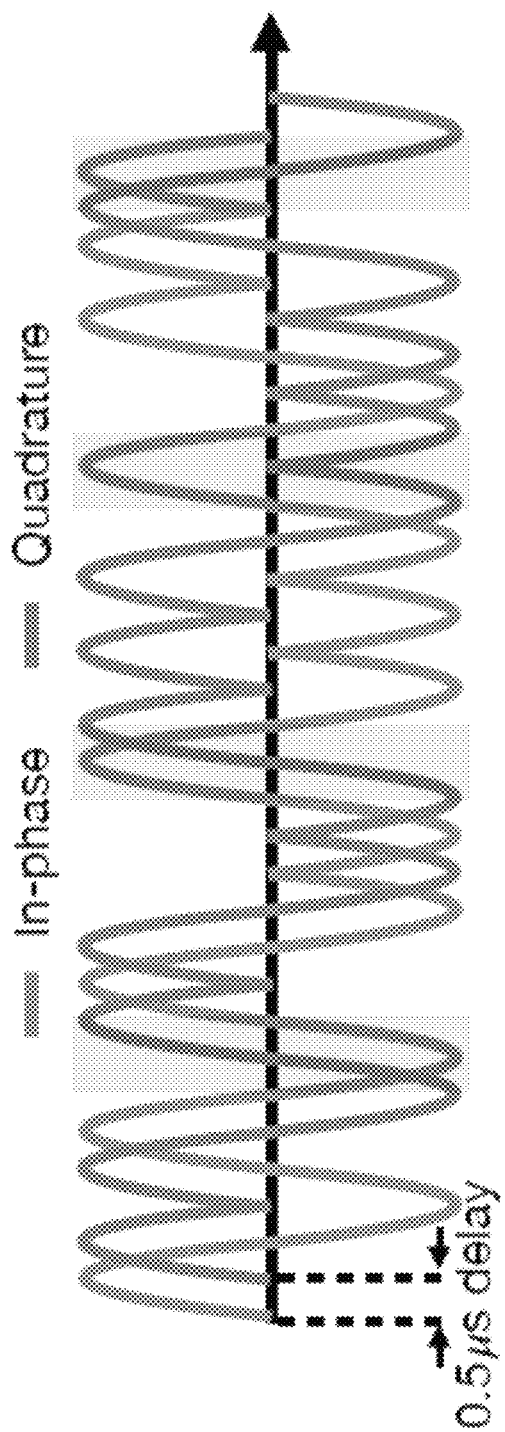
FIG. 15 shows the baseband (I/Q) signal of ZigBee symbol '0', where the Quadrature is delayed by 0.5 μs, the four 3.2 μs non-grayed segments are fed into FFT magnitude calculation while the grayed segments are omitted at Wi-Fi Spectral Scan, according to embodiments of the present invention.

To demonstrate the intuition of the ZigBee signal, the I/Q waveforms of ZigBee symbol '0' are plotted in FIG. 15, where the Quadrature is delayed by 0.5 μs. The ZigBee PHY Layer converts one ZigBee symbol into a 32-bit chip sequence, where the In-phase and Quadrature take 16 chips each, yielding the ZigBee signal of 16 μs with a constant magnitude.

Wi-Fi Spectral Scan

Figure 16:
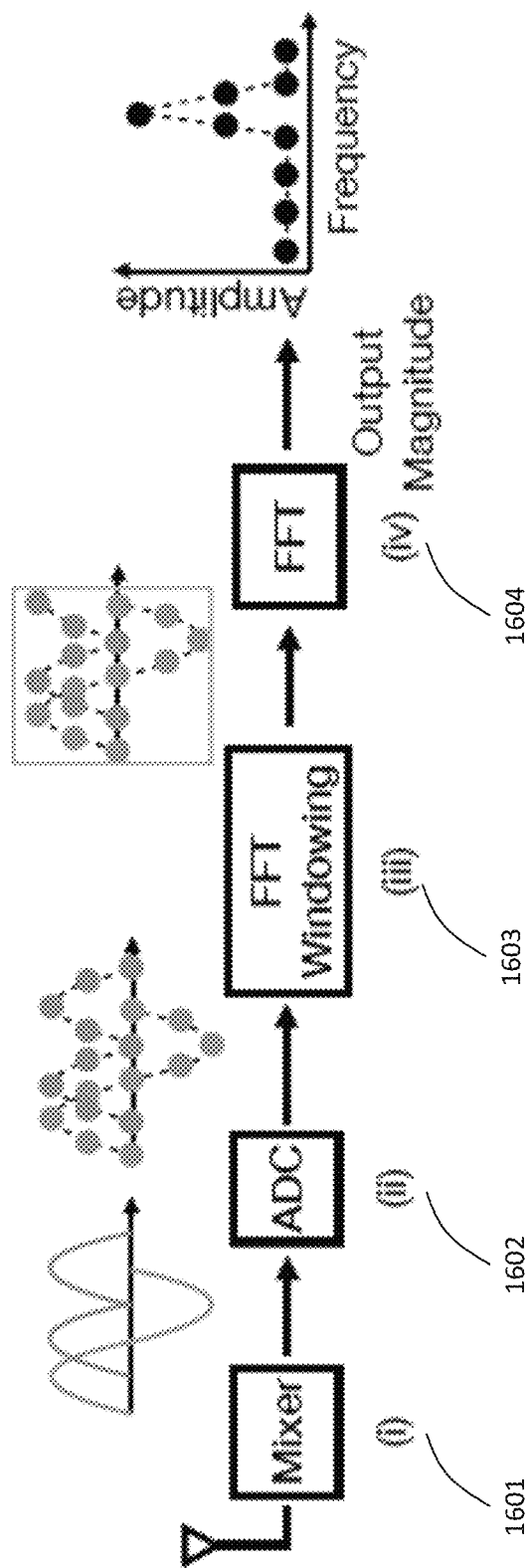
FIG. 16 illustrates how a Wi-Fi device works on Spectral Scan mode, according to embodiments of the present invention.

FIG. 16 illustrates how WiFi Spectral Scan operates to collect the FFT magnitude from the received signal. In Step (i) 1601, the mixer shifts the passband signal to the baseband, which is further sampled at a 20 MHz sampling rate by the analog-to-digital converter (ADC) in Step (ii) 1602. Then in Step (iii) 1603, FFT Windowing is performed every 4 μs to cut the continuously received samples into fragments of 80 samples, where 64 samples (3.2 μs non-grayed segments in FIG. 15) are fed into the FFT calculation in step (iv) 1604 and the rest 16 samples (0.8 μs grayed segments in FIG. 15) are omitted. Finally, in Step (iv), the FFT of the 64 samples is calculated, and the corresponding FFT magnitude is obtained while the phase information is discarded. Since this process does not require the received signal to be Wi-Fi signal, arbitrary signal (e.g., ZigBee) will be fed into the calculation of FFT if Spectral Scan mode is on.

Design of X-Disco

The main designs of X-disco consist of ZigBee Symbol Extraction, ZigBee Coordinator and Router Detection, and Neighbor Information Acquisition.

ZigBee Symbol Extraction

Extracting the ZigBee symbol information on commodity Wi-Fi is realized by exploring the uniqueness of the four FFT magnitudes induced by different ZigBee symbols. To that end, the present invention defines similarity to evaluate how close the four FFT magnitudes of different ZigBee symbols are. Specifically, the four FFT magnitudes of one ZigBee symbol is called one FFT group. Denote the FFT group of the ZigBee symbol i by $\mathbb{Z}_i$, where $i \in \{0, \ldots, F\}$ in hexadecimal. Since the FFT group consists of the four FFT magnitudes calculated from the four 3.2 μs segments, $\mathbb{Z}_i$ is expressed as $\mathbb{Z}_i \triangleq [Z_{i,1}, Z_{i,2}, Z_{i,3}, Z_{i,4}]$, where $Z_{i,k}$ represents the FFT magnitude of the k-th segment in Symbol i. With only eight Wi-Fi subcarriers overlapped with one ZigBee channel, define $Z_{i,k} \triangleq [Z_{i,k}[L], Z_{i,k}[L+1], \ldots, Z_{i,k}[L+7]]$, where $Z_{i,k}[L]$ is the magnitude of the L-th subcarrier in $Z_{i,k}$ and L is the index of the left most subcarrier overlapped with the ZigBee channel. Based on that, the similarity between the FFT group induced by ZigBee symbol i and j as follows:

$$sim(\mathbb{Z}_i, \mathbb{Z}_j) = \Pi_{k=1}^{4} corr(Z_{i,k}, Z_{j,k}), \quad (1)$$

where corn calculates the correlation coefficient between two series. The similarity is defined in such way to guarantee if any two FFT magnitudes in two ZigBee symbols are different, the similarity drops significantly. The FFT group $\mathbb{Z}_i$, namely the template FFT group, is calculated from the transmitted signal of each ZigBee symbol.

Figure 17:
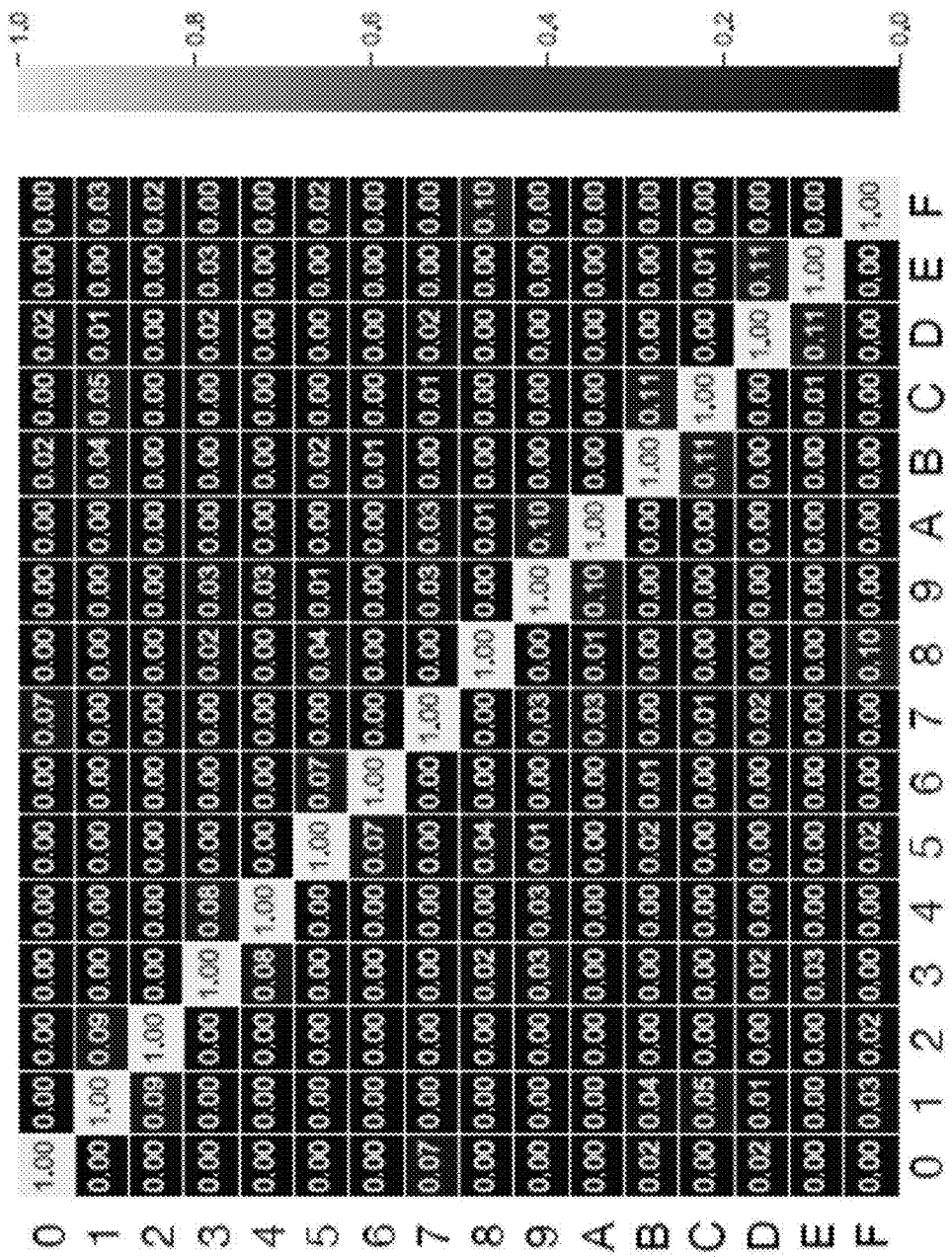
FIG. 17 depicts the similarity between the FFT group of different ZigBee symbols, according to embodiments of the present invention.

With the above definition of the template FFT group of each ZigBee symbol, the similarity between the FFT groups of arbitrary two ZigBee symbols is shown in FIG. 17. Apparently, the similarity between the template FFT groups of different ZigBee symbols is quite small, indicating that ZigBee symbols can be decoded by comparing the similarity, calculated from FFT magnitude without any phase information on commodity Wi-Fi.

Specifically, X-Disco extracts ZigBee symbols at commodity Wi-Fi by comparing the received FFT group with the template FFT group. Formally, for the received FFT magnitudes $Y_n$, $Y_{n+1}$, $Y_{n+2}$, and $Y_{n+3}$, the corresponding FFT group is denoted by $\mathbb{Y}_n \triangleq [Y_n, Y_{n+1}, Y_{n+2}, Y_{n+3}]$. Extracting the ZigBee symbol from the received FFT group $\mathbb{Y}_n$ is achieved by checking which template FFT group has the highest similarity:

$$\max_i sim(\mathbb{Y}_n, \mathbb{Z}_i) \qquad (2)$$

If ZigBee symbol i's template FFT group has the highest similarity, that FFT group $\mathbb{Y}_n$ is decoded as ZigBee symbol 'i'.

1) ZigBee Cross-Detection

As illustrated in FIG. 6A, the ZigBee packet starts with the preamble that consists of eight consecutive symbol '0's, followed by the Start of Frame Delimiter (SFD), PHY Header and the PHY Payload, which are also constructed by 16 ZigBee symbols. Therefore, detecting the arrival of a ZigBee packet at commodity Wi-Fi is achieved by checking if the eight consecutive FFT groups are the same. Specifically, the multiplication of the similarity between the current FFT group $\mathbb{Y}_n$ and the seven FFT groups after that is calculated:

$$\Pi_{i=1}^{7} sim(\mathbb{Y}_n, \mathbb{Y}_{n+4i}) \qquad (3)$$

If this value reaches to a threshold such as 0.8, the eight consecutive ZigBee symbols are detected. Next step is to check if these ZigBee symbols are symbol '0'. If yes, checking if next two symbols are 'A' and '7'. If yes, a ZigBee packet is detected. The FFT group $\mathbb{Y}_n$ captures the start of the ZigBee signal, and the FFT magnitude $Y_n$ is the first FFT magnitude of the first ZigBee symbol '0' in the ZigBee preamble.

2) Fine-Grained Synchronization

Notice that the random delay shifts the whole ZigBee signal and changes the FFT magnitude. By leveraging the knowledge that the first ten ZigBee symbols (preamble and SFD) are known, X-Disco detects the delay via matching the delayed version of the template FFT group of ZigBee symbol '0' and the FFT group of the first received ZigBee symbol '0'. Specifically, the template FFT group for each of 16. ZigBee symbols with all possible delays are created and denoted as $\mathbb{Z}_i^d \triangleq [Z_{i,1}^d, Z_{i,2}^d, Z_{i,3}^d, Z_{i,4}^d]$, where $Z_{i,k}^d$ represents the k-th FFT magnitude of the ZigBee symbol i with a delay of d samples. Thus, the random delay r is detected by finding the r maximizing the similarity between the FFT group of the first received ZigBee symbol '0' and the delayed template FFT group:

$$\max_\tau sim(\mathbb{Y}_n, \mathbb{Z}_0^\tau) \qquad (4)$$

As the random delay is detected, the ZigBee symbols within the PHY header and payload fields, which are also shifted by the same delay, are decoded by checking which template FFT group of the delay T is the closest to the received FFT group:

$$\max_i sim(\mathbb{Y}_n, \mathbb{Z}_i^\tau) \qquad (5)$$

As a result, applying the decoding approach described in Equation (5) on all the received FFT groups, the commodity Wi-Fi device decodes the entire ZigBee packet. Built on top of ZigBee Symbol Extraction and CTC, X-Disco fetches the cross-technology neighbor information in two steps: in the first step ZigBee Coordinator Detection, X-Disco discover ambient ZigBee coordinator and routers to obtain their essential information such as PAN ID and network address, for the next step, Neighbor Information Acquisition, allowing X-Disco to fetch the ZigBee neighbor information that has already been stored in the ambient ZigBee coordinator and routers.

ZigBee Coordinator and Router Detection

Detecting the ZigBee coordinator and routers using the commodity Wi-Fi is non-trivial because it needs to maintain transparency to the existing ZigBee network. One straightforward way is to let the Wi-Fi device passively listen to the ZigBee channel until the periodic broadcasted ZigBee beacon packets are captured and decoded at commodity Wi-Fi via ZigBee Symbol Extraction. The problem with this approach is that most ZigBee networks are typically non-beacon-enabled networks that might not transmit beacon packets.

In contrast to the passive listening, the provided ZigBee Coordinator and Router Detection actively triggers the ambient ZigBee coordinators to share their essential ZigBee network information with the commodity Wi-Fi devices. This is achieved by leveraging the ZigBee Passive Acknowledgement mechanism specified in the ZigBee protocol, where the ZigBee coordinator and routers rebroadcast any received broadcast packets as a confirmation of successfully receiving the packets, as opposed to explicitly transmit the MAC-layer ACK packets. It is worth mentioning that: (i) the ZigBee coordinator and routers are required to rebroadcast the received broadcast packets, which indicate the existence of the ZigBee network, and (ii) rebroadcasting packets is a way to forward the packets, thereby encapsulating the essential ZigBee network information, such as PAN IDs and addresses, in their header fields, as illustrated in FIGS. 5-10B.

The X-Disco device (commodity Wi-Fi device) sends out an emulated ZigBee broadcast packet via CTC and switches to the Spectral Scan mode. Specifically, as described in Section 3, the X-Disco device configures each field in the headers to be the broadcast mode to construct the emulated ZigBee broadcast packet. Then, the CTC technique is applied to obtain the corresponding Wi-Fi packet to emulate this constructed ZigBee broadcast packet and transmit such emulated packet.

When the ZigBee coordinator and routers receive the emulated ZigBee broadcast packet, they fill their PAN ID and address fields into the MAC Header and the Network Header to construct the rebroadcasted packet. Running on the Spectral Scan mode, the X-Disco device applies ZigBee Symbol Extraction to obtain the encapsulated essential ZigBee network information, which are further utilized to enforce the ZigBee coordinator and routers to share the ZigBee neighbor information in the next step, Neighbor Information Acquisition. If there are multiple ZigBee coordinator and routers nearby, the rebroadcasted ZigBee packets are transmitted with different delays due to CSMA mechanism, which ensures ZigBee network information of all ambient ZigBee coordinator and routers are collected without collision.

Neighbor Information Acquisition

Acquiring the ZigBee neighbor information from the ambient ZigBee coordinator and routers leverages the existing Device and Service Discovery mechanism in the ZigBee protocol. Specifically, ZigBee Device and Service Discovery mechanism allows a ZigBee device to request the network addresses of all the ZigBee neighbors associated with a specified ZigBee coordinator or router through exchanging IEEE_addr_req and IEEE_addr_rsp frames. By setting the "RequestType" and "StartIndex" to be 0x01 and 0x00 respectively, a ZigBee device sends an IEEE_addr_req packet to trigger the ZigBee coordinator or router with the network address of "NWKAddrOfInterest" to respond with an IEEE_addr_rsp frame, which carries the number of the associated ZigBee devices in the "NumAssocDev" field and the network addresses of all associated ZigBee devices in the "NWKAddr AssocDevList" field.

In designing Neighbor Information Acquisition, the X-Disco device first emulates the above IEEE_addr_req packet, which is constructed with the "NWKAddrOfInterest" to be the network address of the ZigBee coordinator or router obtained in the ZigBee Coordinator Detection. After the X-Disco device transmits this emulated packet, the ZigBee coordinator or router responds with the corresponding IEEE_addr_rsp frame, which is decoded via ZigBee Symbol Extraction by the X-Disco device. Then, X-Disco skips all fields before "NumAssocDev" and obtains the number of the ZigBee neighbors from "NumAssocDev" field. Eventually, the X-Disco device gets the network address of each ZigBee neighbor from "NWKAddr AssocDevList" field, thereby finishing the discovery of the ambient cross-technology ZigBee devices.

ZigBee Neighbor Validation

It is possible that the discovered ZigBee devices might be outside of the ZigBee device's coverage. Hence, the following steps are provided to further validate the fetched ZigBee neighbor information by leveraging the network address and IEEE address conversion of a specific ZigBee device, provided by the ZigBee Device and Service Discovery mechanism. If "NWKAddrOfInterest" is the network address of the ZigBee device and "RequestType" is set to "0x00" in the IEEE_addr_req packet, as illustrated in FIG. 10B, only the this specific ZigBee device responds with the IEEE_addr_rsp packet, which contains its IEEE address in the "IEEEAddr RemoteDev" field. To validate if a specific ZigBee device is the X-Disco device's neighbor, the X-Disco device emulates an IEEE_addr_req with the network address of a ZigBee device, obtained in Neighbor information Acquisition, and waits for a response. That ZigBee device is decided to be a valid cross-technology neighbor if a corresponding IEEE_addr_rsp packet is captured by ZigBee Symbol Extraction. Considering the possibility of sleeping, the X-Disco device may emulate an IEEE_addr_req frame multiple times.

Wi-Fi Device and ZigBee Device Functional Components

Figure 18:
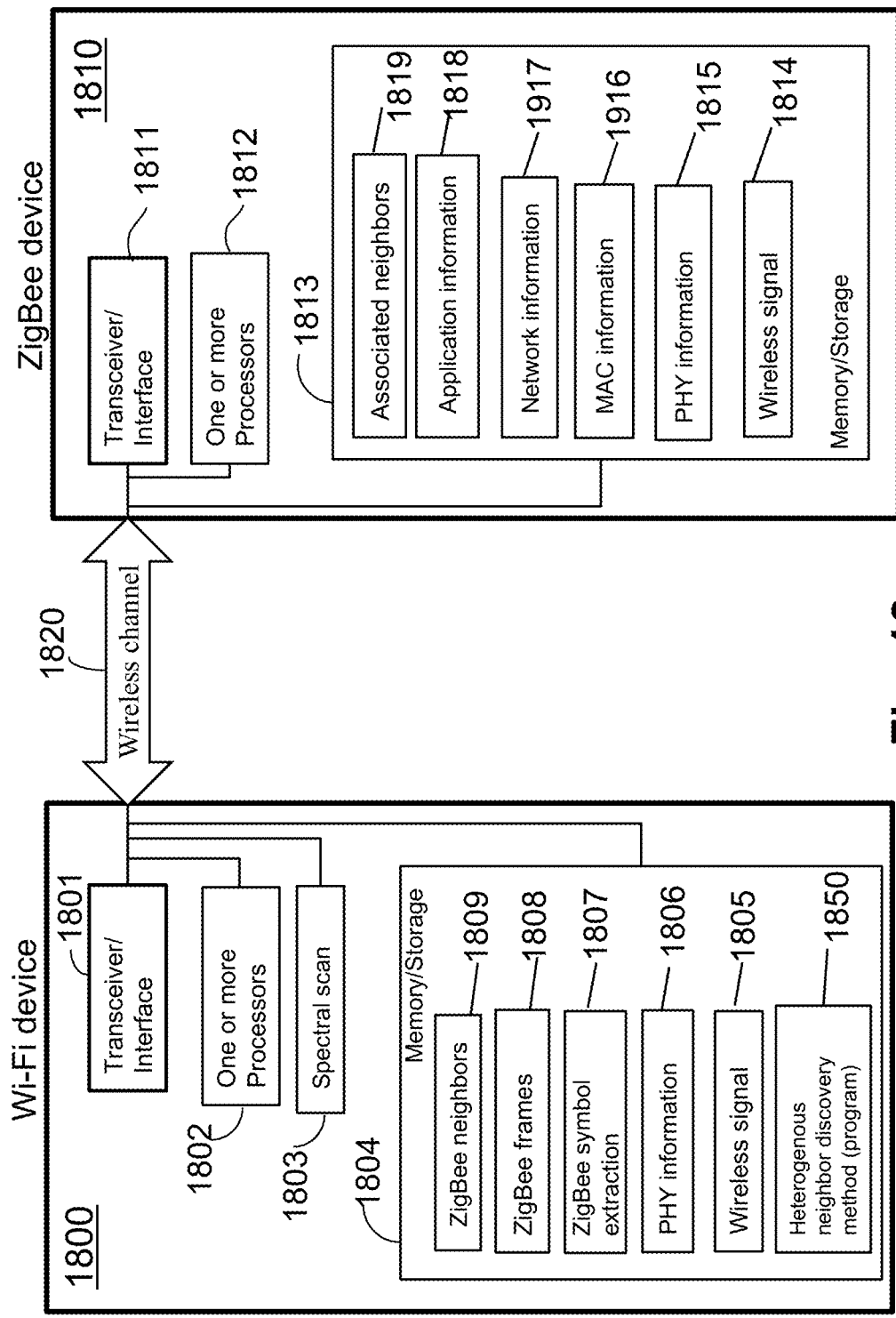
FIG. 18 shows an example of functional components of the Wi-Fi device and ZigBee device in the cross-technology neighbor discovery, according to embodiments of the present invention.

FIG. 18 shows an example of functional components of Wi-Fi device 1800 and ZigBee device 1810 in cross-technology neighbor discovery. The Wi-Fi device 1800 can be referred to as a communication device. The Wi-Fi device 1800 and ZigBee device 1810 make cross-technology communication via wireless channel 1820. A Wi-Fi device 1800 may include an interface (or transceiver) 1801 configured to communicate with ZigBee device 1810 via wireless channel 1820, one or more processors 1802, spectral scan function 1803 and a memory/storage 1804 configured to store heterogeneous neighbor discovery method 1850, wireless signal 1805, PHY information 1806, ZigBee symbol extraction function 1807, processed ZigBee frames 1808 and discovered ZigBee neighbors 1809. The ZigBee device 1810 may include an interface (or transceiver) 1811 configured to communicate with the Wi-Fi device 1800 via the wireless channel 1820, one or more processors 1822, and a memory/storage 1813 configured to store wireless signal 1814, PHY information 1815, MAC information 1816, Network information 1817 and Application information 1818. For ZigBee device acts as coordinator or router, memory also store associated neighbor information 1819. The Wi-Fi device 1800 is configured for discovering heterogenous neighbors in coexisting IoT networks including at least one Wi-Fi device and at least one of Zigbee coordinators, ZigBee routers and ZigBee end devices. The transceiver 1801 is configured to transmit and receive a broadcast packet to communicate with the at least one of Zigbee coordinators, ZigBee routers and ZigBee end devices via wireless channels. The memory/storage 1804 is configured to store the heterogeneous neighbor discovery method 1850, which can be referred to as a computer-implemented method 1850, for discovering heterogenous neighbors in coexisting IoT networks including at least one Wi-Fi device and at least one of Zigbee coordinators, ZigBee routers and ZigBee end devices, and the one or more processors 1802 are configured to execute the computer-implemented method, wherein the method causes the processor coupled with the memory storing instructions implementing the method. In this case, the one or more processors carry out at steps of the instructions, including generating the broadcast packet such that the broadcast packet emulates a ZigBee broadcast frame, transmitting the emulated broadcast packet using a transceiver of the at least one Wi-Fi device according to cross-technology communication (CTC) method, wherein the emulated broadcast packet is configured to trigger the at least one of the Zigbee coordinators, ZigBee routers and ZigBee end devices having received the emulated broadcast packet to rebroadcast the received packet. Further the method includes switching a status of the at least one Wi-Fi device to a spectral scan mode to scan rebroadcasted packets from the at least one of ZigBee coordinators, ZigBee routers and ZigBee end devices, decoding the scanned rebroadcast packets to obtain ZigBee PAN ID and a network address of the at least one of the ZigBee coordinators, ZigBee routers and ZigBee end devices having a rebroadcasted packet, generating an unicast packet such that the unicast packet emulates a ZigBee address request frame with a destination address set to a network address of the at least one of Zigbee coordinators, ZigBee routers and ZigBee end devices, transmitting the emulated unicast packet using the transceiver of the at least one Wi-Fi device according to the CTC method, wherein the emulated unicast packet is configured to trigger the at least one of the Zigbee coordinator, ZigBee routers and ZigBee end devices having received the emulated unicast packet to transmit a ZigBee address response frame, switching the status of the at least one Wi-Fi device to a spectral scan mode to scan the ZigBee address response frame from the at least one of ZigBee coordinators, ZigBee routers and ZigBee end devices; decoding the scanned ZigBee address response frame to obtain network addresses of the ZigBee end devices associated with the ZigBee coordinator or ZigBee router having transmitted the ZigBee address response frame, switching the status of the at least one Wi-Fi device to a spectral scan mode to scan an address response frame from at least one ZigBee end device, and determining the at least one ZigBee end device to be a neighbor of the at least one Wi-Fi device if the scanned address response frame is transmitted by the at least one ZigBee end device.

We claim:

1. A computer-implemented method for discovering heterogenous neighbors in coexisting Internet of Things (IOT) networks including at least one Wi-Fi device and at least one of Zigbee coordinators, ZigBee routers and ZigBee end devices, wherein the method uses a processor coupled with a memory storing instructions implementing the method, wherein the instructions, when executed by the processor, carry out at steps of the method, comprising:

generating a broadcast packet such that the broadcast packet emulates a ZigBee broadcast frame;

transmitting the emulated broadcast packet using a transceiver of the at least one Wi-Fi device according to cross-technology communication (CTC) method, wherein the emulated broadcast packet is configured to trigger the at least one of the Zigbee coordinators and ZigBee routers having received the emulated broadcast packet to rebroadcast the received packet;

switching a status of the at least one Wi-Fi device to a spectral scan mode to scan rebroadcasted packets from the at least one of ZigBee coordinators and ZigBee routers;

decoding the scanned rebroadcast packets to obtain ZigBee PAN ID and a network address of the at least one of the ZigBee coordinators and ZigBee routers having a rebroadcasted packet;

generating a unicast packet such that the unicast packet emulates a ZigBee address request frame with a destination address set to a network address of the at least one of Zigbee coordinators, ZigBee routers and ZigBee end devices;

transmitting the emulated unicast packet using the transceiver of the at least one Wi-Fi device according to the CTC method, wherein the emulated unicast is configured to trigger the at least one of the Zigbee coordinator, ZigBee routers and ZigBee end devices having received the emulated unicast packet to transmit a ZigBee address response frame;

switching the status of the at least one Wi-Fi device to a spectral scan mode to scan the ZigBee address response frame from the at least one of ZigBee coordinators, ZigBee routers and ZigBee end devices;

decoding the scanned ZigBee address response frame to obtain network addresses of the ZigBee end devices associated with the ZigBee coordinator or ZigBee router having transmitted the ZigBee address response frame;

switching the status of the at least one Wi-Fi device to a spectral scan mode to scan an address response frame from at least one ZigBee end device; and determining the at least one ZigBee end device to be a neighbor of the at least one Wi-Fi device if the scanned address response frame is transmitted by the at least one ZigBee end device.

2. The method of claim 1, wherein the emulated broadcast packet is configured to be a ZigBee broadcast data frame.

3. The method of claim 1, wherein the emulated broadcast packet is received by the at least one of the Zigbee coordinators and ZigBee routers that are in a neighborhood of the Wi-Fi device.

4. The method of claim 2, wherein the emulated broadcast packet triggers the Zigbee coordinators and ZigBee routers having received the broadcast frame to rebroadcast the data frame as passive acknowledgment.

5. The method of claim 4, wherein the ZigBee coordinators and ZigBee routers fill their PAN IDs and address fields into the MAC Header and the Network Header in the rebroadcasted data frames.

6. The method of claim 5, wherein the data frame rebroadcasting is performed using random backoff so that the Wi-Fi device can scan all rebroadcasted data frames transmitted by Zigbee coordinators and ZigBee routers.

7. The method of claim 1, wherein the Wi-Fi device decodes the scanned ZigBee rebroadcasted data frames to obtain ZigBee PAN IDs and network addresses of the ZigBee coordinators and ZigBee routers, wherein the network addresses of the ZigBee coordinators and ZigBee routers represent ZigBee coordinators and ZigBee routers discovered by the Wi-Fi device.

8. The method of claim 7, wherein the Wi-Fi device decodes the ZigBee signal by detecting eight consecutive ZigBee symbol '0's and followed ZigBee symbols 'A' and '7'.

9. The method of claim 8, wherein the Wi-Fi device decodes the ZigBee symbol by comparing the FFT magnitude similarity between the received ZigBee symbol $\mathbb{Z}$ and the template ZigBee symbol $\mathbb{Z}_i$ (i=0, 1, . . . , 15) according to $$\max_i sim(\mathbb{Z}_*, \mathbb{Z}_{*i}).$$

10. The method of claim 9, wherein the template ZigBee symbol $\mathbb{Z}_i$ (i=0, 1, 2, . . . , 15) is calculated from the transmitted signal of the ZigBee symbols '0', '1', '2', . . . , 'F'.

11. The method of claim 1, wherein the emulated unicast packet is configured to be a ZigBee IEEE_addr_req frame with destination address set to the network address of the discovered ZigBee coordinator or ZigBee router or ZigBee end device.

12. The method of claim 11, wherein the emulated unicast packet sent to ZigBee coordinator or ZigBee router is configured to trigger the destinated ZigBee coordinator or ZigBee router to send the network addresses of the ZigBee end devices associated with the ZigBee coordinator or ZigBee router, wherein the network addresses of the ZigBee end devices represent potential ZigBee neighbors discovered by the Wi-Fi device via neighbor information acquisition.

13. The method of claim 1, wherein the ZigBee coordinator or ZigBee router having received the emulated ZigBee IEEE_addr_req frame constructs and transmits a ZigBee IEEE_addr_res frame by filling the network addresses of the associated ZigBee end devices.

14. The method of claim 11, wherein the emulated unicast packet destinated to ZigBee end device is configured to trigger the destination ZigBee end device to send the IEEE address of the ZigBee end device.

15. The method of claim 1, wherein the Wi-Fi device scans the ZigBee IEEE_addr_res frames in spectral scan mode.

16. The method of claim 14, wherein the Wi-Fi device validates each potential ZigBee end device by transmitting an emulated ZigBee IEEE_addr_req frame with destination address set to the network address of the ZigBee end device.

17. The method of claim 16, wherein the destinated ZigBee end device receives the emulated ZigBee IEEE_addr_req frame if the ZigBee end device is a neighbor of the Wi-Fi device, otherwise, the Wi-Fi device determines that the ZigBee end device is outside of a communication range of the Wi-Fi device and is not a neighbor of the Wi-Fi device.

18. The method of claim 17, wherein the ZigBee end device having received the mulated ZigBee IEEE_addr_req frame transmits a ZigBee IEEE_addr_res frame.

19. The method of claim 18, wherein the Wi-Fi device verifies a potential ZigBee end device to be a neighbor if corresponding ZigBee IEEE_addr_res frame is scanned and decoded, wherein the verified ZigBee end devices are ZigBee neighbor discovered by the Wi-Fi device.

20. The method of claim 1, wherein the Wi-Fi device actively triggers ZigBee coordinators, ZigBee routers and ZigBee end devices to respond by transmitting the emulated ZigBee packets instead of passively listen for ZigBee transmission.

21. A communication device for discovering heterogenous neighbors in coexisting Internet of Things (IOT) networks including at least one Wi-Fi device and at least one of Zigbee coordinators, ZigBee routers and ZigBee end devices, comprising:
  a transceiver configured to transmit and receive a broadcast packet and a unicast packet to communicate with the at least one of Zigbee coordinators, ZigBee routers and ZigBee end devices via wireless channels;
  a memory configured to store a computer-implemented method for discovering heterogenous neighbors in coexisting IoT networks including at least one Wi-Fi device and at least one of Zigbee coordinators, ZigBee routers and ZigBee end devices; and
  a processor configured to execute the computer-implemented method, wherein the method causes the processor coupled with the memory storing instructions implementing the method, wherein the processor carries out at steps of the instructions, comprising:
  generating the broadcast packet such that the broadcast packet emulates a ZigBee broadcast frame;
  transmitting the emulated broadcast packet using a transceiver of the at least one Wi-Fi device according to cross-technology communication (CTC) method, wherein the emulated broadcast packet is configured to trigger the at least one of the Zigbee coordinators and ZigBee routers having received the emulated broadcast packet to rebroadcast the received packet;
  switching a status of the at least one Wi-Fi device to a spectral scan mode to scan rebroadcasted packets from the at least one of ZigBee coordinators and ZigBee routers;
  decoding the scanned rebroadcast packets to obtain ZigBee PAN ID and a network address of the at least one of the ZigBee coordinators and ZigBee routers having a rebroadcasted packet;
  generating a unicast packet such that the unicast packet emulates a ZigBee address request frame with a destination address set to a network address of the at least one of Zigbee coordinators, ZigBee routers and ZigBee end devices;
  transmitting the emulated unicast packet using the transceiver of the at least one Wi-Fi device according to the CTC method, wherein the emulated unicast packet is configured to trigger the at least one of the Zigbee coordinator, ZigBee routers and ZigBee end devices having received the emulated unicast packet to transmit a ZigBee address response frame;
  switching the status of the at least one Wi-Fi device to a spectral scan mode to scan the ZigBee address response frame from the at least one of ZigBee coordinators, ZigBee routers and ZigBee end devices;
  decoding the scanned ZigBee address response frame to obtain network addresses of the ZigBee end devices associated with the ZigBee coordinator or ZigBee router having transmitted the ZigBee address response frame;
  switching the status of the at least one Wi-Fi device to a spectral scan mode to scan an address response frame from at least one ZigBee end device; and
  determining the at least one ZigBee end device to be a neighbor of the at least one Wi-Fi device if the scanned address response frame is transmitted by the at least one ZigBee end device.

22. The communication device of claim 21, wherein the emulated broadcast packet is configured to be a ZigBee broadcast data frame.

23. The communication device of claim 21, wherein the emulated broadcast packet is received by the at least one of the Zigbee coordinators and ZigBee routers that are in a neighborhood of the Wi-Fi device.

24. The communication device of claim 22, wherein the emulated broadcast packet triggers the Zigbee coordinators and ZigBee routers having received the broadcast frame to rebroadcast the data frame.

25. The communication device of claim 24, wherein the ZigBee coordinators and ZigBee routers fill their PAN IDs and address fields into the MAC Header and the Network Header in the rebroadcasted data frames.

26. The communication device of claim 25, wherein the data frame rebroadcasting is performed using random backoff so that the Wi-Fi device can scan all rebroadcasted data frames transmitted by Zigbee coordinators and ZigBee routers.

27. The communication device of claim 1, wherein the Wi-Fi device decodes the scanned ZigBee rebroadcasted data frames to obtain ZigBee PAN IDs and network addresses of the ZigBee coordinators and ZigBee routers, wherein the network addresses of the ZigBee coordinators and ZigBee routers represent ZigBee coordinators and ZigBee routers discovered by the Wi-Fi device.

\* \* \* \* \*